US007673232B2

(12) United States Patent
Rashid et al.

(10) Patent No.: US 7,673,232 B2
(45) Date of Patent: Mar. 2, 2010

(54) APPLICATION MIGRATION TO LANGUAGES IMPLEMENTING TAG FIELDS

(75) Inventors: Fuad Rashid, San Mateo, CA (US); Domingo Mihovilovic, Menlo Park, CA (US); Atul Suklikar, San Carlos, CA (US)

(73) Assignee: Siebel Systems, Inc., San Mateo, CA (US)

( * ) Notice: Subject to any disclaimer, the term of this patent is extended or adjusted under 35 U.S.C. 154(b) by 905 days.

(21) Appl. No.: 09/955,361

(22) Filed: Sep. 18, 2001

(65) Prior Publication Data

US 2007/0192681 A1 Aug. 16, 2007

(51) Int. Cl.
*G06N 3/00* (2006.01)

(52) U.S. Cl. .................................................... 715/243

(58) Field of Classification Search ................. 709/206, 709/203; 345/764; 717/148; 715/523, 500, 715/513, 517, 530, 234, 243, 254; 342/357.09
See application file for complete search history.

(56) References Cited

U.S. PATENT DOCUMENTS 5,897,645 A * 4/1999 Watters ...................... 715/523
6,285,315 B1 * 9/2001 Pratt ...................... 342/357.09
6,289,506 B1 * 9/2001 Kwong et al. ............... 717/148
6,304,898 B1 * 10/2001 Shiigi ......................... 709/206
2002/0007393 A1 * 1/2002 Hamel ......................... 709/203
2002/0054115 A1 * 5/2002 Mack et al. .................. 345/765
2002/0075311 A1 * 6/2002 Orbanes et al. ............. 345/764
2004/0205452 A1 * 10/2004 Fitzsimons et al. .......... 715/500
2004/0205616 A1 * 10/2004 Rosenberg et al. .......... 715/523

OTHER PUBLICATIONS

Ladd, Eric et al, Using HTML 4, XML, and Java 1.2, 1999, Que, Platinum Edition, p. 1004.*
"Adobe(r) GoLive(tm) 5.0 User Guide," 2000, Adobe, pp. 306-307.*
"XSL Transformations (XSLT) Version 1.0," 16 Nov. 1999, <http://www.w3c.org/TR/xslt>, pp. 1-102.*
Hall, Marty, "Core Servlets and JavaServer Pages(tm)," Prentice Hall, 2000, pp. 274-283.*
"Adobe(r) GoLive(tm) 5.0 User Guide," 2000, Adobe, pp. 62-63.*

* cited by examiner

*Primary Examiner*—Kyle R Stork
(74) *Attorney, Agent, or Firm*—Campbell Stephenson LLP

(57) ABSTRACT

A method of migrating Cartesian coordinate-based views is disclosed. The method includes providing applet-based templates and associating the templates to Cartesian coordinate-based views. Controls of the applet can be modified according to the requirements of the Cartesian coordinate-based view. The views are used as user interfaces.

72 Claims, 20 Drawing Sheets

SELECT MIGRATION OPTIONS

1. NEW APPLETS
2. NEW VIEWS
3. MODIFIED APPLETS
4. MODIFIED VIEWS
5. MARK THE APPLETS AND VIEWS (DEFAULT CONDITIONS: 1-4 IF SELECTED, 5 IF UNSELECTED)

MIGRATION OUTPUT LOG
LISTED BELOW ARE THE MIGRATED APPLETS AND VIEWS

| | Type (Applet/View) | Name | Category (Applet Class/View Type) | Model | Migrated? (Yes/No) | New/Modified |
|---|---|---|---|---|---|---|
| 1 | Applet | 123 | List | List | Yes | New |
| 2 | View | 345 | > 1 Applet | Chart | Yes | New |
| 3 | View | 567 | Tree Applet | Tree | Yes | New |
| 4 | Applet | 675 | Form | Form | Yes | Modified |
| 5 | Applet | 134 | Form | Form | No | New |
| 6 | Applet | 456 | Tree | Tree | No | Modified |
| 7 | View | 890 | Tree Applet | Tree | Yes | Modified |
| 8 | View | 450 | 1 Applet | List | No | New |
| 9 | View | 554 | 1 Applet | List | Yes | New |
| 10 | Applet | 345 | Chart | Chart | No | Modified |

*Fig. 5*

APPLICATION MIGRATION TO LANGUAGES IMPLEMENTING TAG FIELDS

BACKGROUND OF THE INVENTION

1. Field of the Invention

This invention relates to migrating applications, in particular user views and interfaces of applications, previously used in Cartesian coordinate-based platforms into tag field-based platforms.

2. Description of the Related Art

Hyper-text markup language (HTML) is an authoring language to create documents for applications on the world wide web (WWW). HTML's common use for WWW applications often employs HTML as a web-based language; however, with HTML's ability to structure information and to link to other documents, HTML is found to be a useful language to present views and user interface documents. Views and user interface documents are typically used to provide end-user access to databases and similar programs providing information.

Views and interfaces provide users an access to database application, and programs and other similar content providing applications. Numerous user views and interfaces have used platforms that have included Windows® operating systems by the Microsoft Corporation of Redmond, Washington and languages such as Java® by Sun Microsystems of San Jose, CA. User views and interfaces in Windows®, Java®, and similar operating systems and languages have been written to include a Cartesian coordinate system that relates a control or command to a specific X-Y coordinate pair on a page or document.

HTML, and similar web-based languages, do not make use of such Cartesian coordinate systems; therefore, languages such as HTML cannot make use of the X-Y coordinate values of prior platforms which relate key interface elements to information stored in databases and similar content-providing applications. HTML makes use of control characters, also referred to as tags or tag fields, to determine presentation in a document of text, images, and links. Typically, several hundred tags are used to layout the information in an HTML page. For example, tags are used to allow text formatting which can specify paragraphs, line spacing, and horizontal rules. Graphics and links to other pages are also specified by HTML tags. Link tags allow users to be directed to another page by choosing or clicking on an image or a word on a current page. HTML also provides for the use of templates. A template is a blank form that provides, among other features, instruction as to how fields are set, field locations, field lengths, field widths, and field heights. Placeholder tags are provided and the placeholder tags can be replaced by controls. Each placeholder tag is associated with a unique identifier (ID). Creating a mapping or association between the control and the unique ID specifies the position of a control in a document.

An applet is defined as a programmatic construct that contains information about how data is to be presented. Users can create new applets, or users can modify existing or vendor provided applets. Modified applets are web-enabled or HTML-enabled; however, user-specific requirements necessitate added changes or modifications to the pre-existing applet.

Views are interfaces to the user in which data are presented. A view can include one or a number of applets. Data can be part of a database or similar resource. When an application runs, the application looks to a data repository. A user looks for a particular view. The application looks to the particular view and the applets associated with that view. The application looks up information about what data the application is supposed to provide and how the data is to be presented (i.e., laid out for the user). The application will leave the database and renders the applet in the specific way the data is supposed to be presented and shows the view to the user.

An applet contains configuration information about how the applet looks and what data the applet will show. A number of controls can be associated with an applet. Each control can be tied to a field in an object or the database. In a particular database example, database objects are constructed in column format. Particular controls are tied to the database table columns. Objects can include various data such as names, phone numbers, pictures, etc. Controls can also be independent from database tables. In other words, a control can merely be a name or a similar object. User interface buttons located on a screen are considered controls. An interface button with a control associated with it can have some functionality associated with the control. Various views and applications can use the same interface button that contains specific functionality. A user therefore can obtain specific functionality by activating (i.e., pushing) a particular button.

Applets also contain field controls and non-field controls. Field controls define what data should be shown on the applet, and are different for all applets. Non-field controls are user interfaces such as buttons that are common for all applets and are copied from a model applet to new applets.

Oftentimes, users find themselves with HTML interfaces working with prior applications based on a Cartesian coordinate system. Translating views and interfaces to tag-based languages such as HTML can involve creating drag and drop routines. The translating process requires a user to manually select views and/or interfaces; select controls and drag controls onto applets; drag the views and/or interfaces; and drop the views and/or interfaces into appropriate locations on a blank HTML template. Considering the thousands of prior Cartesian coordinate-based applications that potentially are needed to be converted to HTML, using the manual drag and drop process is a labor-intensive procedure requiring a great deal of time and resources.

SUMMARY OF THE INVENTION

What is needed and is disclosed herein is an invention that provides for a method to migrate existing Cartesian coordinate-based views to tag field views.

In one embodiment, a method includes providing a template that is associated with a Cartesian coordinate-based view. Applets having controls are mapped by way of the controls to the template. Users can modify controls and applets according the requirements of the particular existing Cartesian coordinate-based views.

Other embodiments include apparatus and computer program products that performs the migration of the Cartesian coordinate-based views to the tag field views.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

FIG. 5 is a migration output log illustrating modified, created (new), and migrated applets and/or views.

Figure 1:
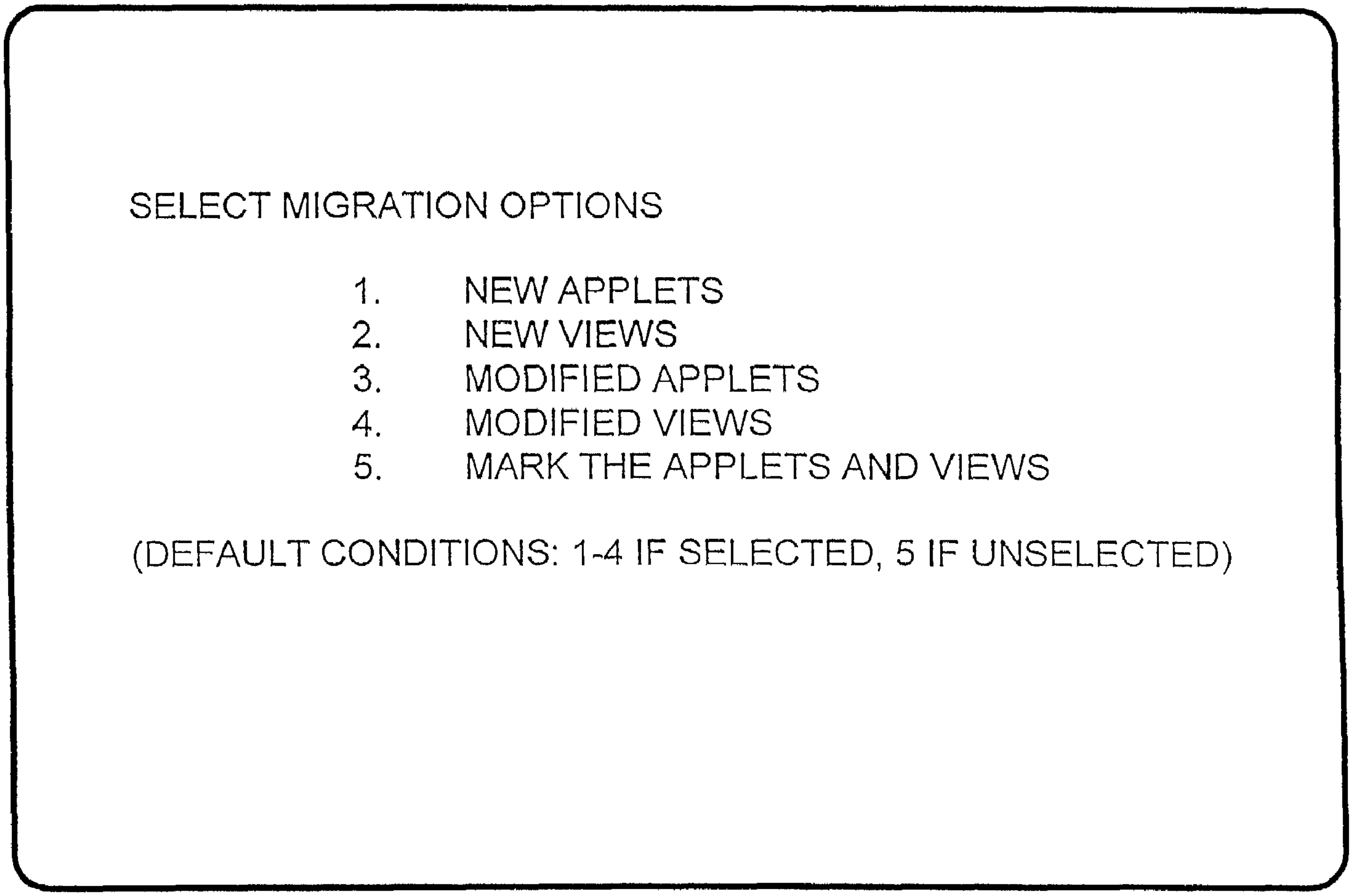
FIG. 1 is a user screen illustrating a user interface to migrate applets and views.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the scope of the present invention as defined by the appended claims.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

The present invention provides a method and apparatus for migrating of pre-existing Cartesian coordinate views to tag/tag field views. Tag/tag field views can be based on HTML or a similar language employing tags/tag fields. A template is provided, modified, or created associating the Cartesian coordinate views to specific applets and controls of the applets. Applets can be provided, created, and/or modified according to the requirements of the user. By associating the Cartesian coordinate views to applets, migration to the tag/tag field views is readily performed. User intervention in the migration process is minimal. User chooses the applicable applets and requests migration of similar Cartesian coordinate views based on the applets that are chosen.

The user avoids the need to migrate each individual Cartesian coordinate view. By providing a template, applicable applets, and controls, and associating the Cartesian coordinate views to the template the Cartesian coordinate views are efficiently and quickly migrated to tag/tag field-based views without undue user intervention.

User Chooses Applets and Views

FIG. 1 is a user screen illustrating a user interface to migrate applets and views. A user with applications that are in the form of non-HTML user views and applets (i.e., Cartesian coordinate-based) can choose to migrate new applets and views. If acceptable applets and views exist, the user can elect to modify these applets and views to be able to be used in HTML. Selecting the “New Applets” option results in all new applets created by the user to be migrated. Selecting the “New Views” option results in all new views created by the user to be migrated. Selecting the “Modified Applets” option results in the following two customizations of standard applets being migrated. The first customization is addition of controls: mapping for controls added to a standard applet are added to the corresponding applet HTML template. The second customization is deletion of controls: mappings for controls that are deleted from standard applets are deleted from the corresponding applet HTML template. Selecting the “Modified Views” option results in two customizations of standard views being migrated. The first customization is addition of applets: mappings for applets added to a standard view are added to the corresponding view HTML template. The second customization is deletion of applets: mappings for applets deleted from a standard view are deleted from the corresponding view HTML template. Option 5 of FIG. 1 is to “Mark the Applets and Views” but not to perform migration. Migration is not performed on the selected applets and views; however, the selected applets and views are flagged and identified.

Figure 2:
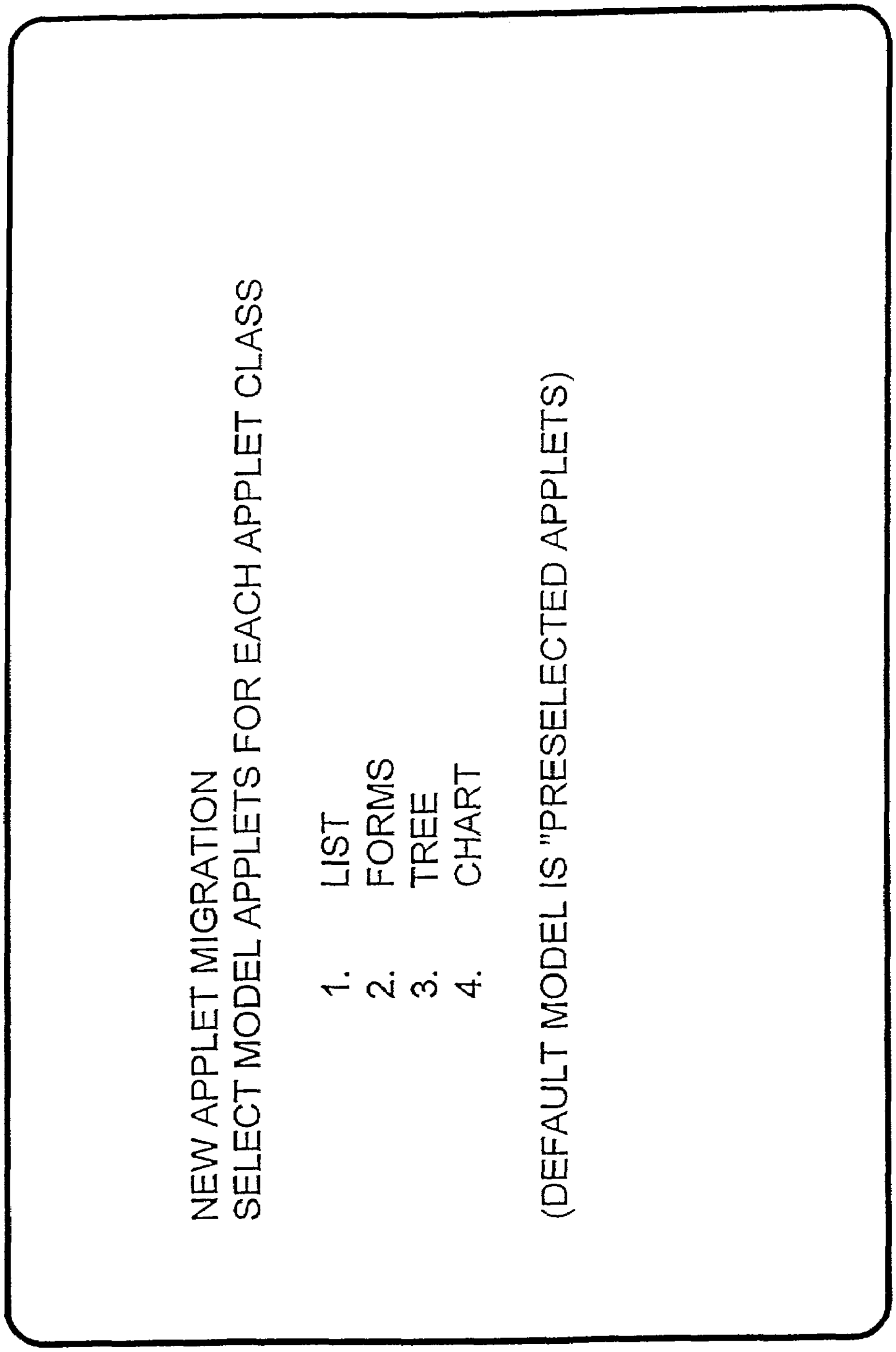
FIG. 2 is a user screen illustrating requesting a user to select among various applet classes.

FIG. 2 is a user screen illustrating requesting a user to select among various applet classes. Different interfaces or applet classes can be made available to the user. The user can select among a list-type of interface, a form-type of interface, a tree-type of interface, and a chart-type of interface. An automatic selection can be provided to search for the most appropriate applet class or classes. Additional applet classes and/or other types of interfaces can be made available, and searches are performed for the pre-existing and added applet classes.

Figure 3A:
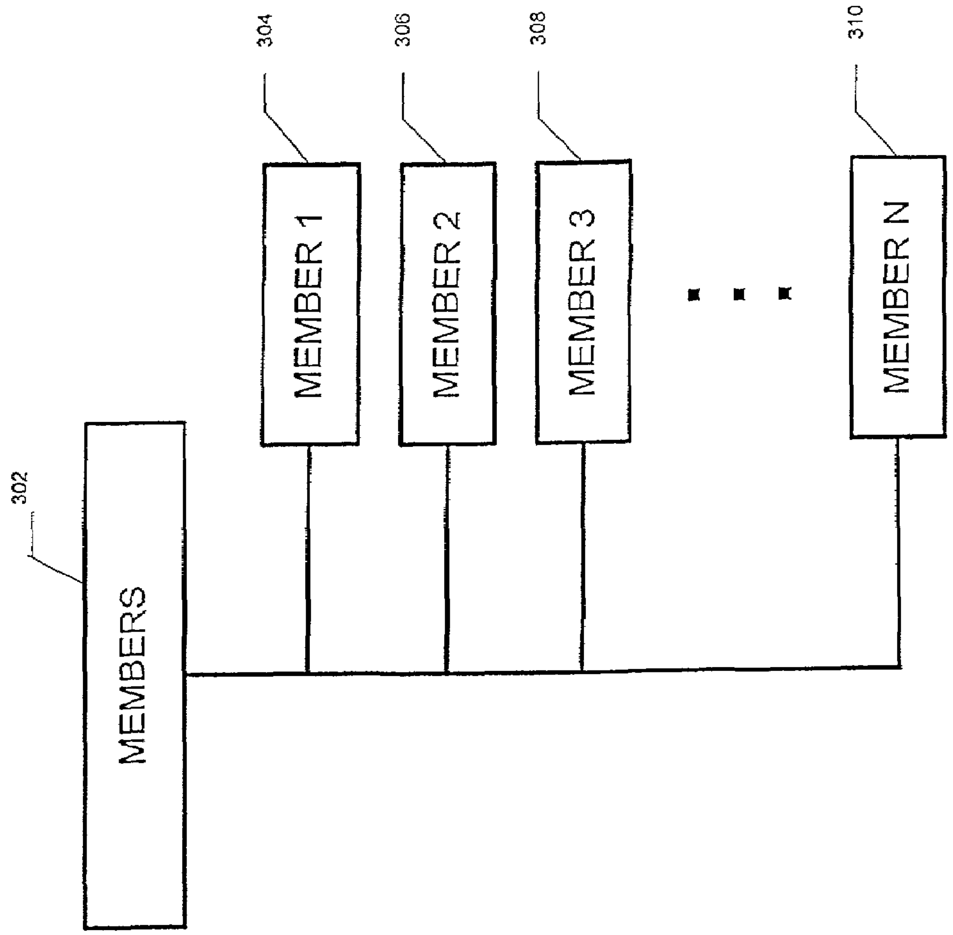
FIG. 3A is a list-type of applet class.

FIG. 3A is a list-type of applet class. When data is presented in a list arrangement, there typically is a header, represented by members 302. Below members 302 is a list that includes member 1 304, member 2 306, member 3 308, up to and including member N 310.

Figure 3B:
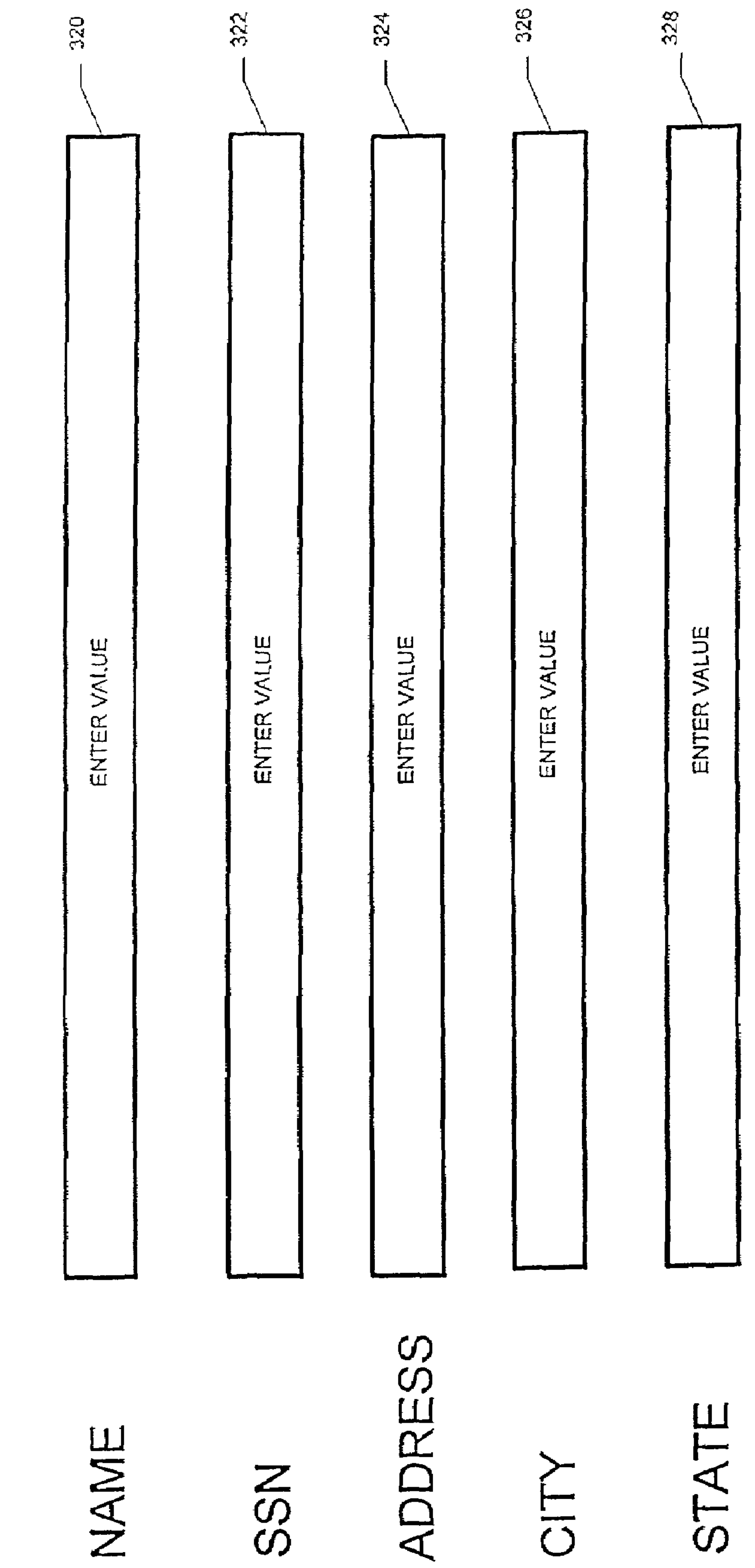
FIG. 3B is a form-type of applet class.

FIG. 3B is a form-type of applet class. Data, such as personnel records, typically are in a form-type arrangement. Various fields are included in a form. Fields in the form can include name field 320, social security number or SSN field 322, address field 324, city field 326, and state field 328. The form-type applet class is used often for data records for applications such as personnel files. Other applications can also include service records, medical history records, and other records that relate an individual person or item to specific information regarding that person or item.

Figure 3C:
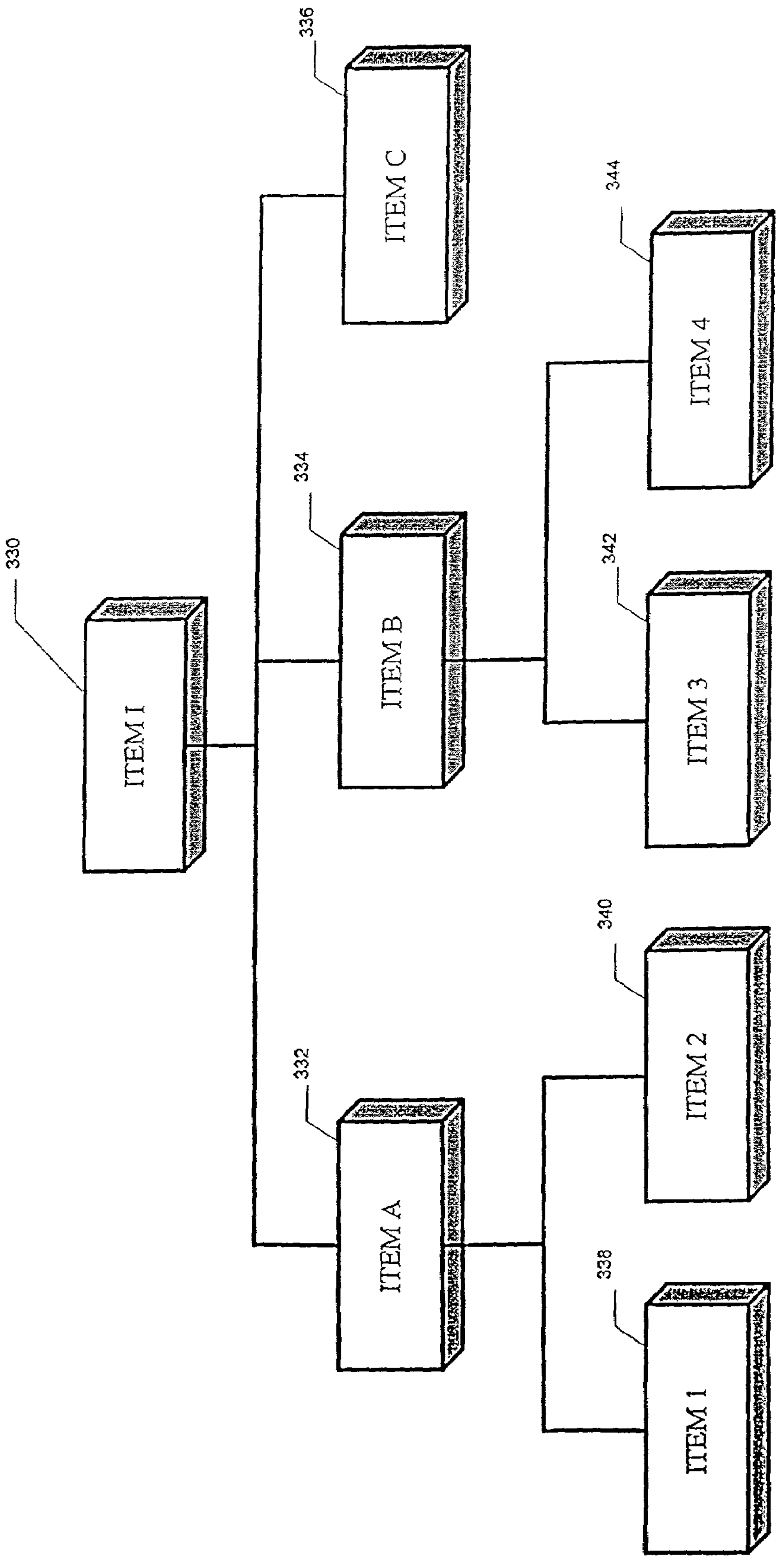
FIG. 3C is a tree-type of applet class.

FIG. 3C is a tree-type of applet class. Data that are best presented in a hierarchical manner or a tree arrangement make use of the tree-type applet class. The tree-type applet class provides for various levels and classes in which objects are arranged. A top level or parent class Item 1 330 is provided. Child classes Item A 332, Item B 334, and Item C 336 exist below Item 1 330. Item A 332 is parent class of Item 1

338 and Item 2 340. Item B is parent class to Item 3 342 and Item 4 344. The tree-type applet class can be used to relate persons and/or items to one another in a hierarchical manner. Applications can include organizational charts. The tree-type applet class can also relate individual records with one another.

Figure 3D:
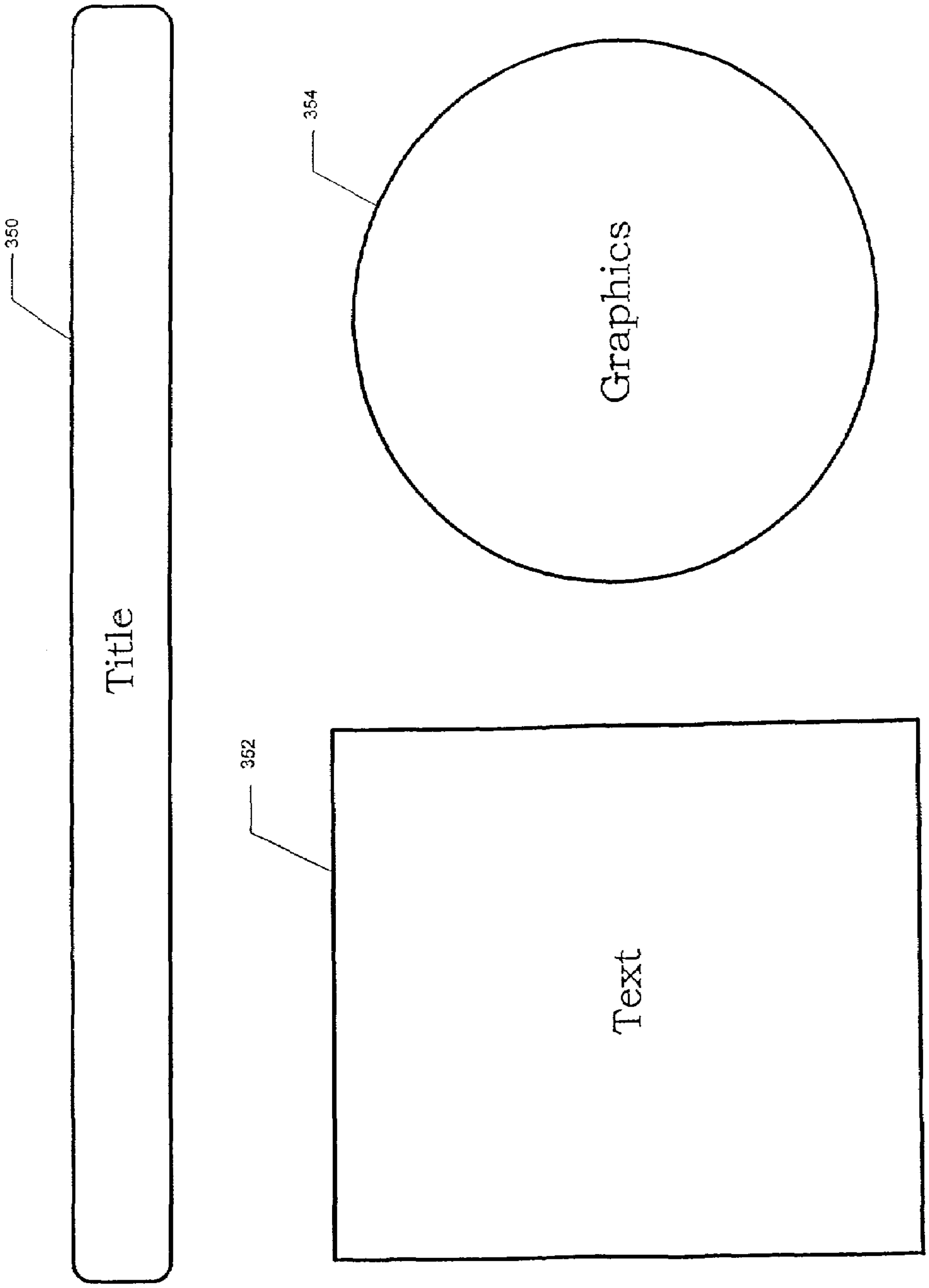
FIG. 3D is a chart-type of applet class.

FIG. 3D is a chart-type of applet class. When data includes a combination of text and graphics, chart-type applet class can be the appropriate arrangement. In the chart-type applet class provided are an interface for text 352, an interface for graphics 354, and an interface for a title 350. The chart-type of applet class can be used for presentation material with standard layouts for text and graphs.

Additional applet classes can be provided depending on the need and applicability of future HTML user views and interfaces Users can find that other views and interfaces are more appropriate to their needs. Providing a predefined set of views allows users to associate data to views and interfaces. Applets are created and/or modified so that they are related to the particular classes.

Figure 4:
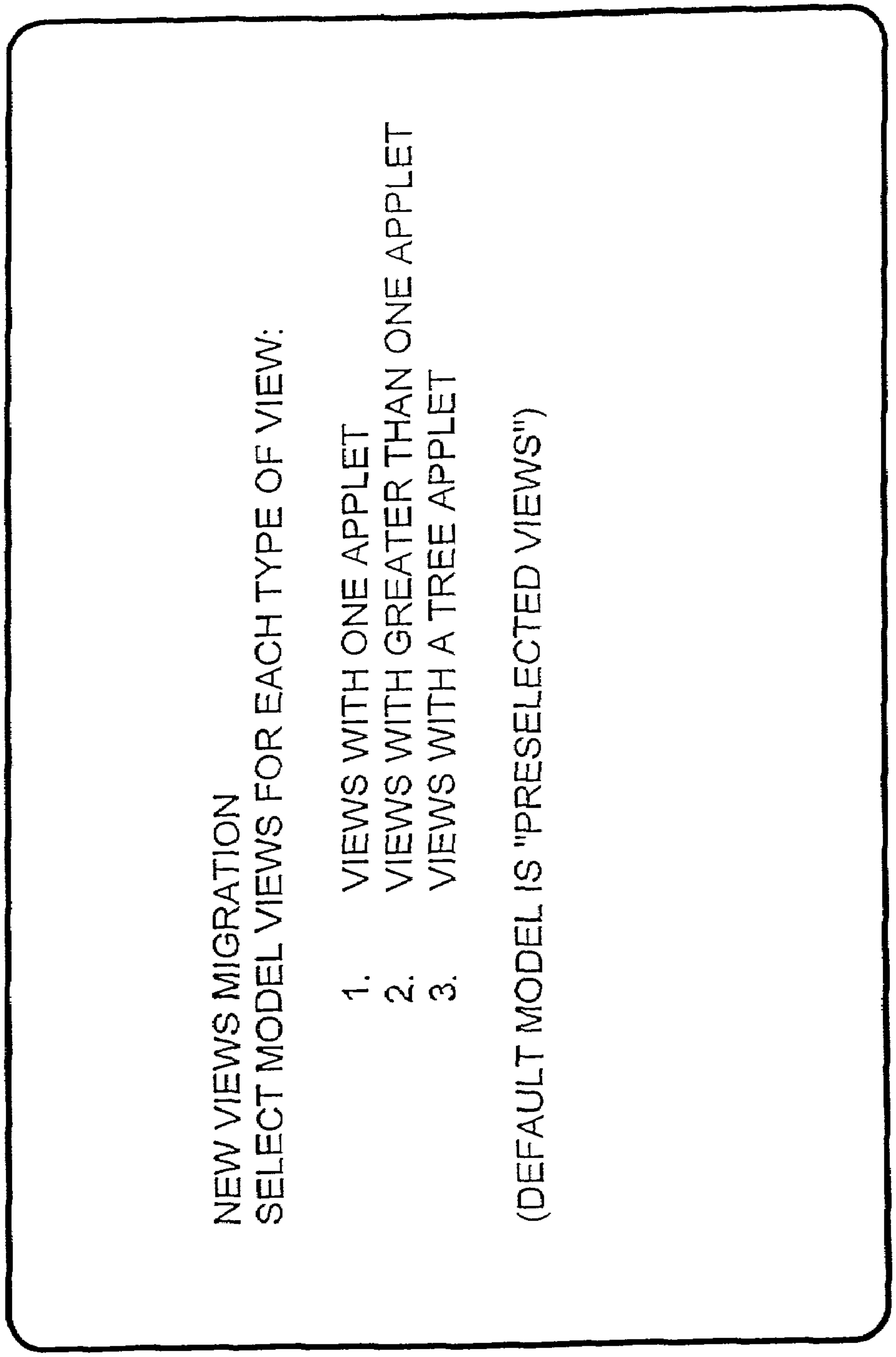
FIG. 4 is a user screen interface illustrating migration of new views.

FIG. 4 is a user screen interface illustrating migration of new views. In certain cases pre-existing (i.e., Cartesian coordinate-based views) relate to different applet-type classes. For example, personnel records can be part of a organizational chart. Therefore a form-type applet class is used for the individual record, and a tree-type applet class is used to relate the individual record to other individual records. Form-type applet class records can also be part of a more comprehensive chart-type applet class. In other words, individual form-type applet class records are included in the text portion of the chart-type applet class. Users are asked to select from a list of views that have one applet; views with more than one applet; and views that use a tree applet class.

FIG. 5 is a migration output log illustrating modified, created (new), and migrated applets and/or views. In this particular embodiment, six column descriptions are provided. For each application or record that is output on the migration log, a description is provided as to type (applet or view); the name of the application; the category, in the case of views categories of applets are described, in the case of applets, applet class is described; applet class; migration status to HTML; and whether the application is new or modified.

A user can have the option to migrate all customized applets and views; an option that is referred to herein as mode 1. Alternatively a user has the option to migrate select applets and/or views; an option referred to herein as mode 2.

Converting Applets and Views

Figure 6:
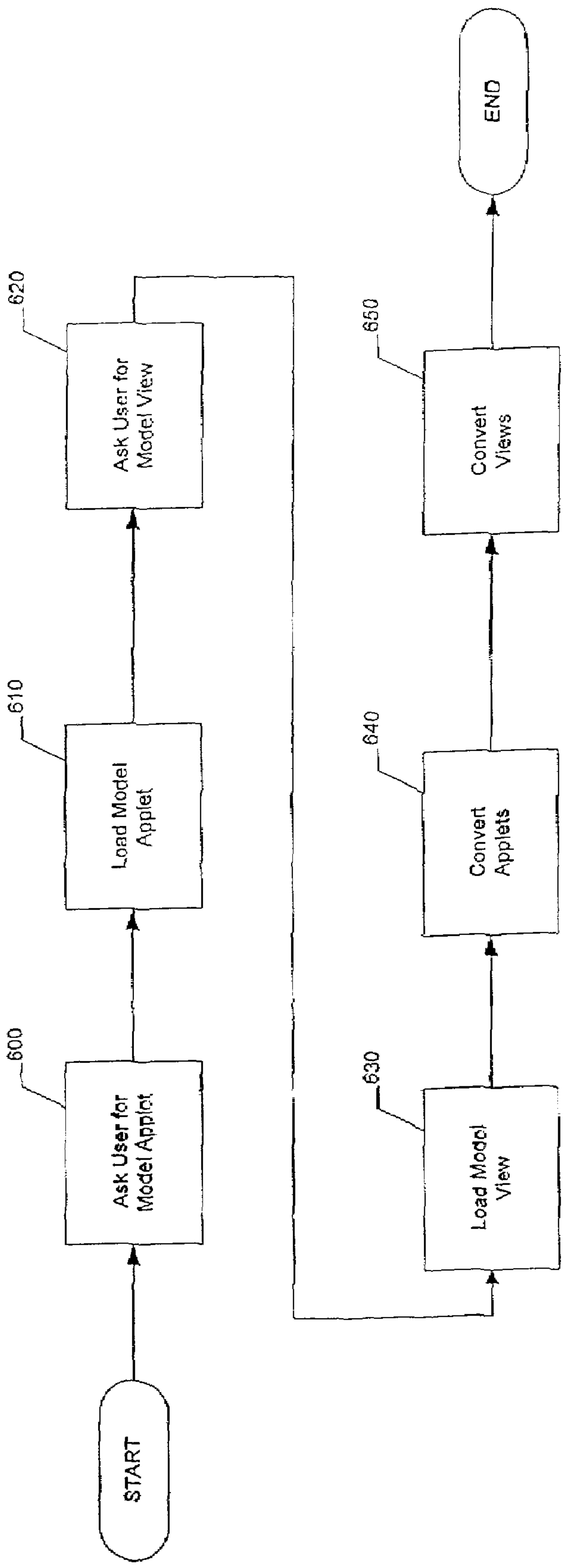
FIG. 6 is a flow chart illustrating top level process of converting views and applets to web-based applications.

FIG. 6 is a top-level flow chart illustrating the conversion of applets and views. A user is asked to select a model applet, step 600. The user loads the selected model applet, step 610. A model view is requested to be selected by the user, step 620. The model view is loaded, step 630. A process takes place to convert the applets, step 640. Then a process takes place to convert the views, step 650. The following pseudo-code illustrates a routine called "RunWizard" that performs conversion of applets and views.

```
RunWizard( )
{
    Ask user for model applet.
    Load model applet and store following info
    {
        HTML template to which this applet is mapped (stored in
        variable APPL_HTML)
```

-continued

```
        All non-field controls and their properties and the IDs to
        which they are mapped (stored in variable CTRL_LIST).
        Mapping IDs of all field controls based on sequence number
        (This list of IDs will be referred to as IDLIST).
    }
    Ask user for model view.
    Load model view and store following info
    {
        HTML template to which this view is mapped (stored in
        variable VIEW_TMPL).
        Mapping IDs of all applets based on sequence number
        (This list of IDs will be referred to as IDLIST,
        specifically stored in variable APPL_IDLIST).
    }
    Enumerate all applets
    {
        If new applet
            ConvertNewApplet( )
        Else if modified applet
            ConvertModifiedApplet( )
    }
    Enumerate all views
    {
        If new view
            ConvertNewView ( )
        Else if modified view
            ConvertModifiedView ( )
    }
}
```

Figure 7:
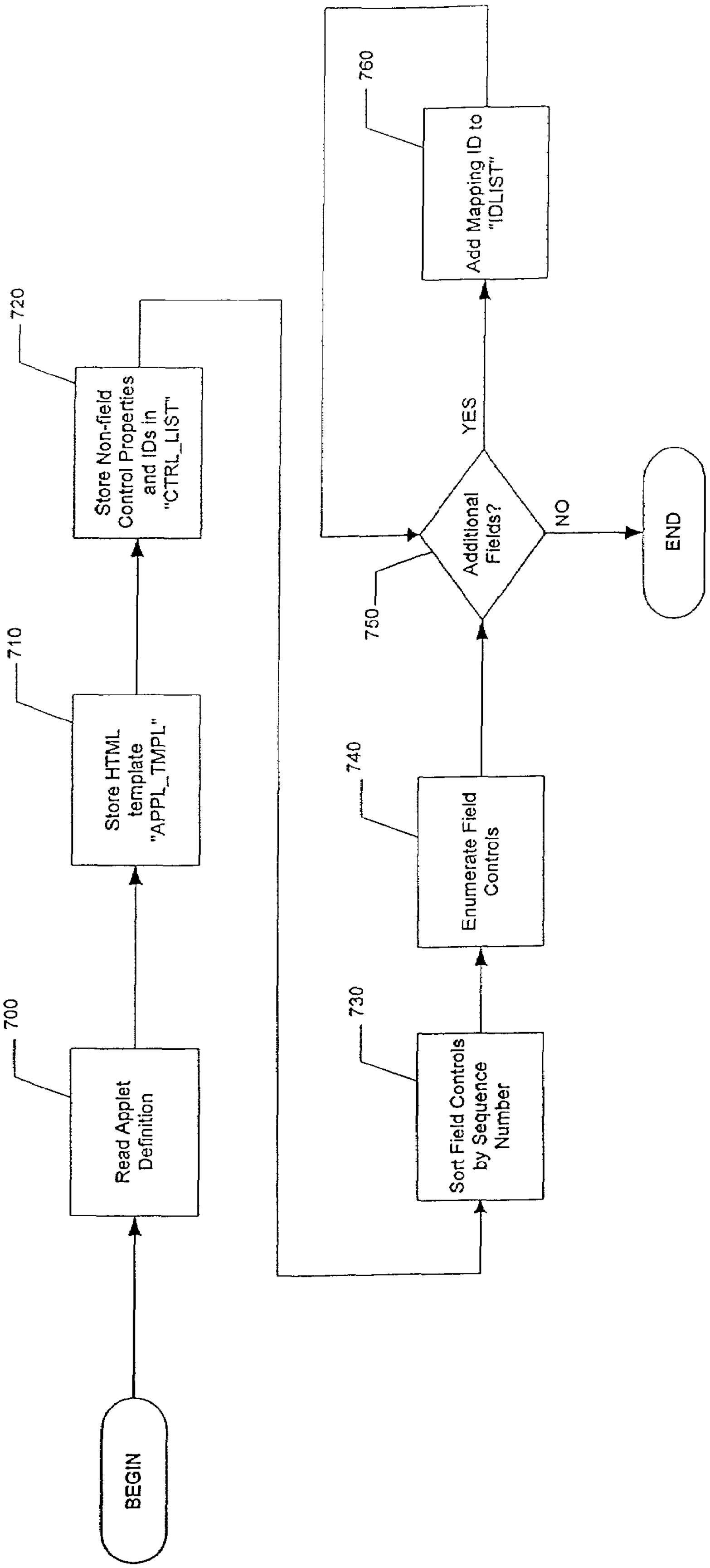
FIG. 7 is a flow chart illustrating loading of model applets.

FIG. 7 is a flow chart illustrating the loading of model applets. The loading of model applets is represented by step 610 of FIG. 6. An applet definition is read, step 700. The predefined applet definition is based on a model applet selected by the user. The HTML template "APPL_TMPL" is stored, step 710. Non-field controls of the applet (specifically properties and identifications (IDs)) are stored in a list variable "CTRL_LIST," step 720. All field controls are sorted and listed by sequence numbers, step 730. The list of field controls is examined at one by one, this is also referred to as enumeration of the field controls, step 740. Additional fields are examined for, step 750. If additional fields are found, the mapping ID of the found field is added to the list variable, "IDLIST," step 760. If no additional fields are found, the process of looking for model applets ends.

Figure 8:
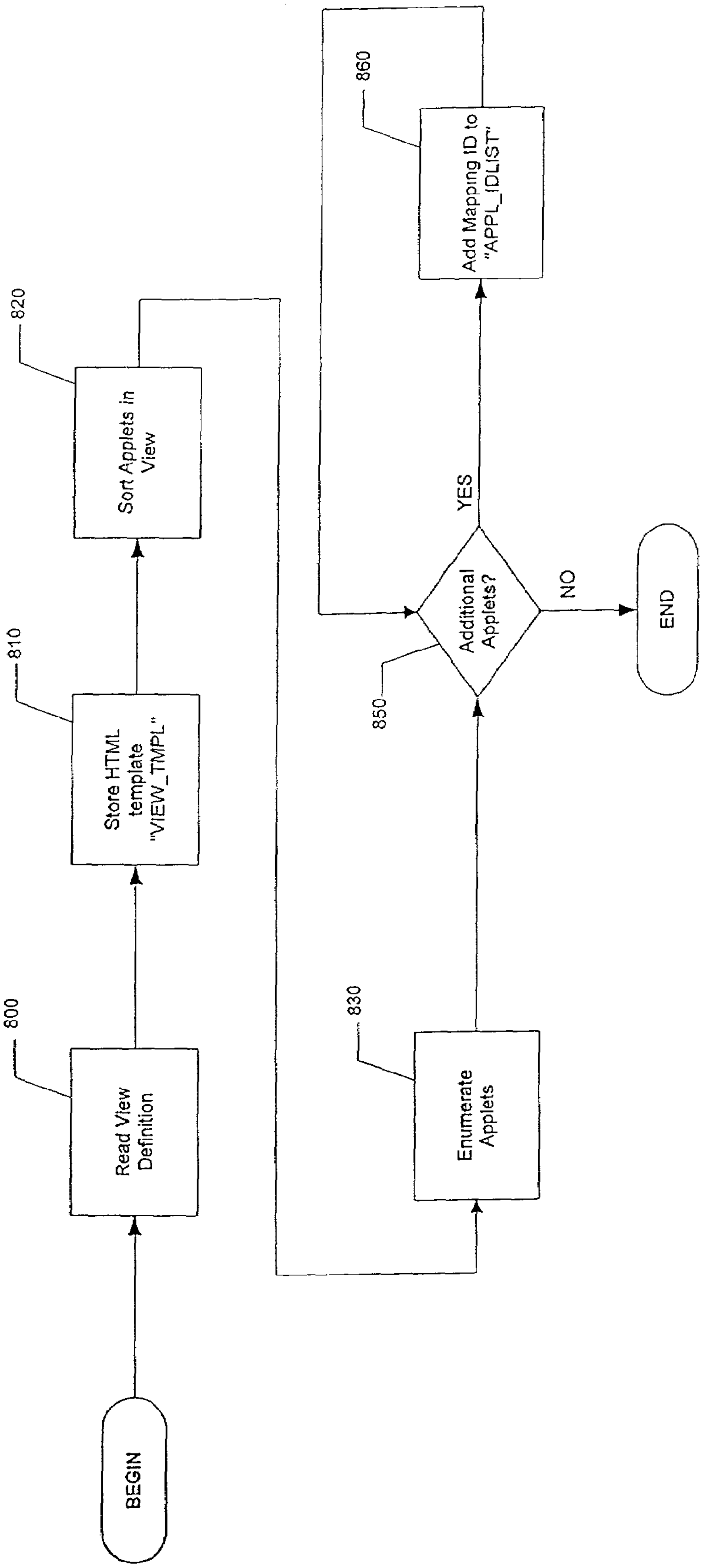
FIG. 8 is a flow chart illustrating loading of model views.

FIG. 8 is a flow chart illustrating loading of model views. The loading of model views is represented by step 630 of FIG. 6. First, a view definition is read, step 800. The predefined view definition is based on the model view selected by the user. The HTML template "VIEW_TMPL" is stored, step 810. The applets in the view definition are sorted and listed, step 820. The applet list is then enumerated, or each applet in the list is examined one-by-one, step 830. A determination is made as to whether there are additional applets, step 850. If additional applets are found, the mapping ID of the found applet is added to the list variable "APPL_IDLIST." If no additional applets are found, the process of loading model views ends.

Figure 9:
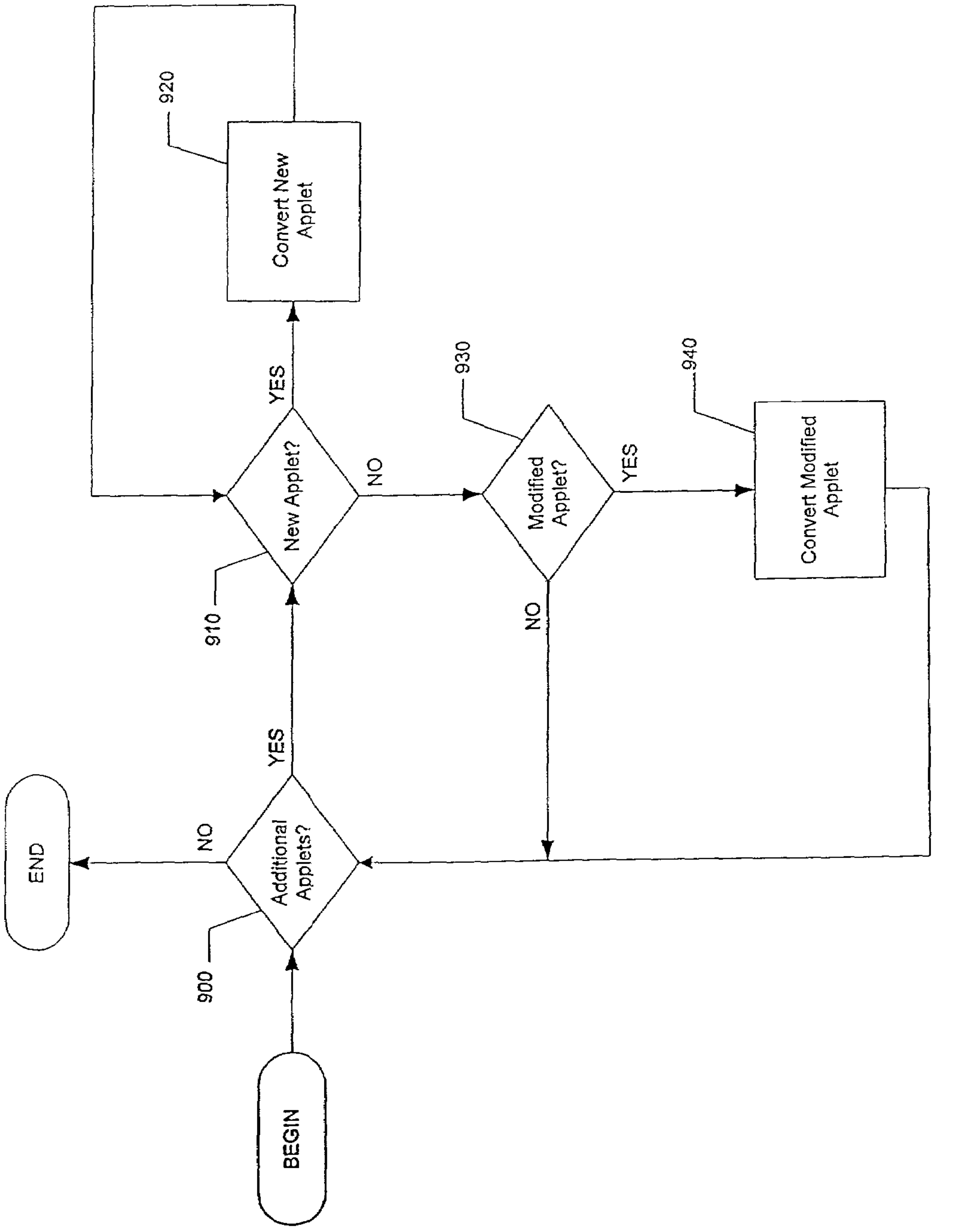
FIG. 9 is a flow chart illustrating converting applets.

FIG. 9 is a flow chart illustrating the conversion of applets. Applets to be converted can either be new or modified applets. Step 640 of FIG. 6 represents the conversion of new and modified applets. A determination is made as to whether there are applets to be converted, step 740. If no applets are to be converted, the process of converting applets ends. If there is an applet to be converted, a determination is made whether it is a new applet, step 910. If it is a new applet, the applet is converted, step 920. A new applet that is converted is treated as a converted applet. If an applet is not a new applet, step 910, a determination is made whether the applet is a modified applet, step 930. If the applet is not a modified applet, the process goes to step 900. If the applet is a modified applet, the modified applet is converted, step 940.

Figure 10:
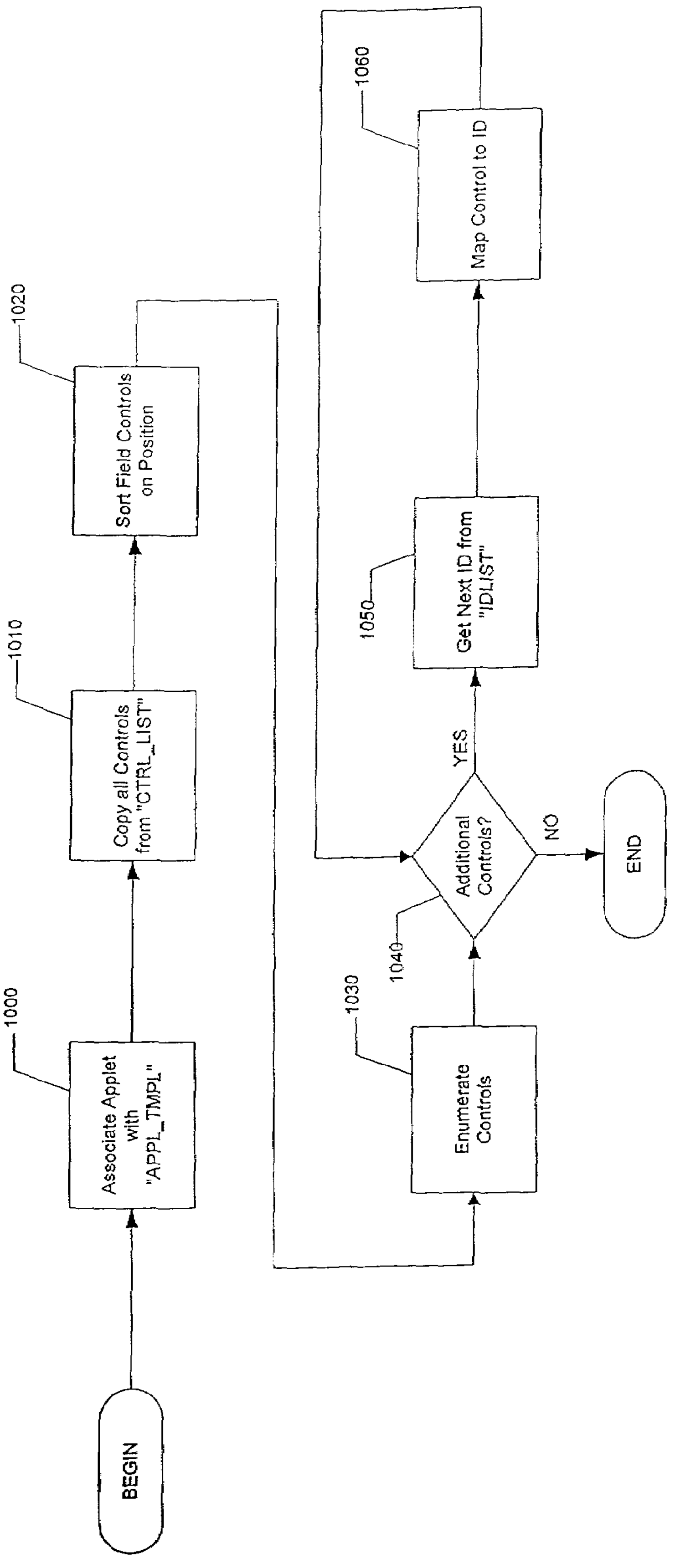
FIG. 10 is a flow chart illustrating converting new applets.

FIG. 10 is a flow chart illustrating the conversion of new applets. The conversion of new applets is represented by step 920 of FIG. 9. The previous pseudo-code program "RunWizard" calls a routine "ConvertNewApplet." The flow chart of FIG. 10 represents the routine "ConvertNewApplet." The conversion of new applets involves creating all non-field controls that were in the model applet and creating mappings for the non-field controls with the corresponding IDs. A sequence number is assigned to field controls of the applet-based on the position of the field control (X-Y) value in the applet. Sequence numbers are assigned from left to right and from top to bottom. Mappings for the field controls are then created using the assigned sequence numbers. For example, the field with sequence number "1" is mapped to the first ID in the list variable "IDLIST."

The new applet is associated with the HTML template "APPL_TMPL," step 1000. Controls listed in the list variable "CTRL_LIST" are copied, step 1010. Field controls are sorted by position, step 1020. Each control in the list is examined or enumerated, step 1030. A determination is made as to whether additional controls are to be examined, step 1040. If no additional controls, the process ends. If additional controls are found, the next ID number from the list variable "IDLIST" is retrieved, step 1050. The control is mapped to the specific ID identified in step 1050, step 1050. The process goes back to step 1040 to determine if additional controls exist.

Figure 11:
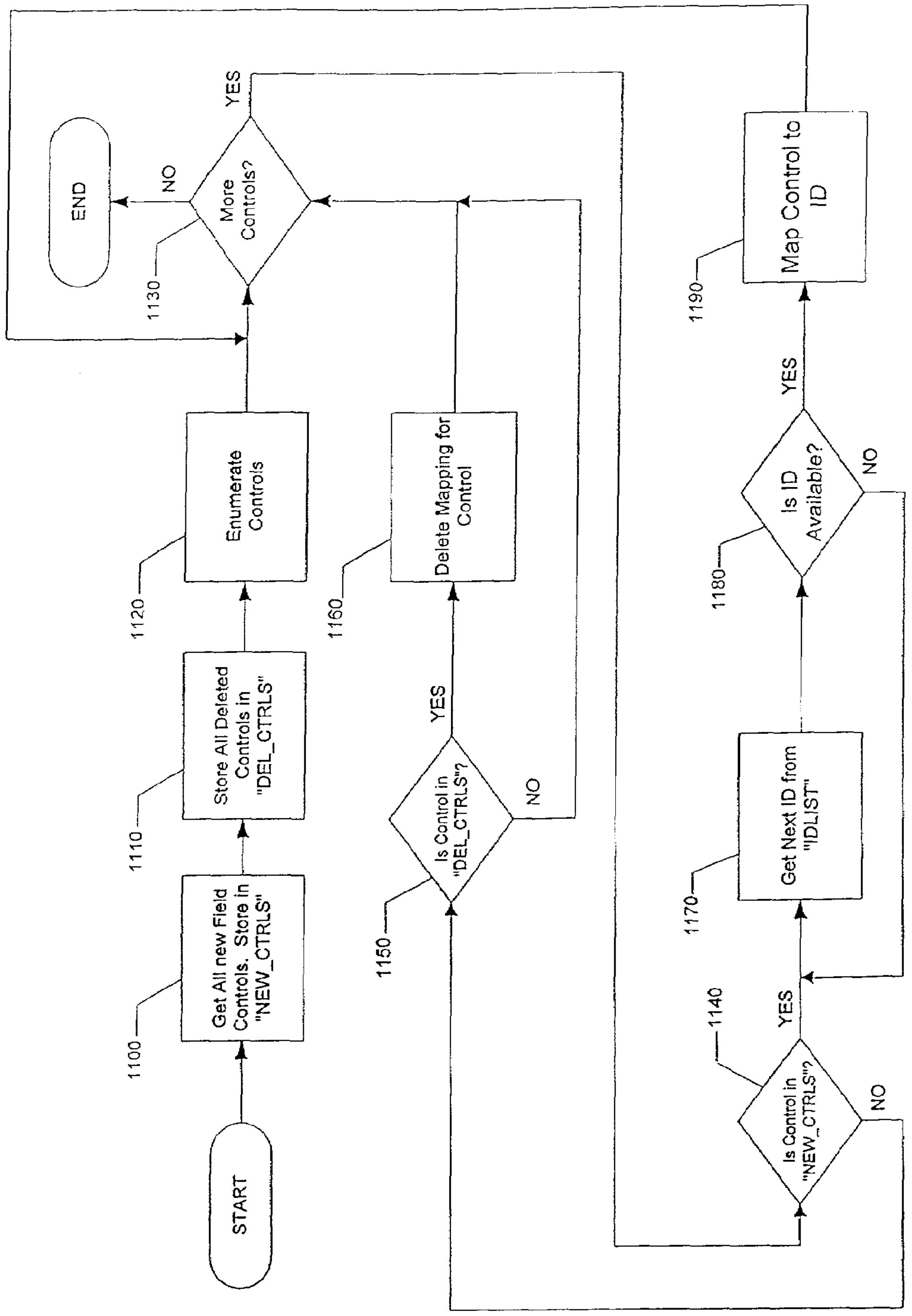
FIG. 11 is a flow chart illustrating converting modified applets.

FIG. 11 is a flow chart illustrating the conversion of modified applets. Converting modified applets is represented by step 930 of FIG. 9. The previous pseudo-code program "RunWizard" calls a routine "ConvertModifiedApplet." The flow chart of FIG. 11 represents the routine "ConvertModifiedApplet." The conversion of modified applets involves finding new fields in the current applet. New fields are fields added by the user. In addition, there can be deleted fields, fields in a vendor-supplied applet that were deleted by the user. Deleted fields are also found and identified. For a user-added field, a mapping is performed for the first ID in the list variable "IDLIST." The particular ID is not mapped to any other field. For deleted fields, the previous mapping is deleted for the particular deleted field.

The process retrieves new field controls of the modified applet. New field controls are stored in the list variable "NEW_CTRLS," step 1100. All deleted field controls are stored in the list variable, "DEL_CTRLS," step 1110. Each of the field controls in the list variables "NEW_CTRLS" and "DEL_CTRLS" is examined or enumerated, step 1120. A determination is made as to whether additional field controls (new or deleted controls) are available, step 1130. If no more controls are available, the process for converting modified applets ends. If additional controls are available, a determination is made if the control is a new control in the list variable "NEW_CTRLS," step 1140. If the control is not a new control, a determination if the control is in the list variable, "DEL_CTRLS," step 1150. If the control fails step 1150, the process goes back to step 1130. If the control is found in "DEL_CTRLS," the mapping for control is deleted. If the control is a new control, the next available ID is retrieved from the list variable "IDLIST," step 1170. A determination is made as to whether the next available ID is available, step 1180. If the ID is available, "IDLIST" is searched until an available ID is found. The available ID is then mapped to the control, step 1190. The process then goes to step 1130 to determine if more controls are to be either mapped (added) or deleted.

Figure 12:
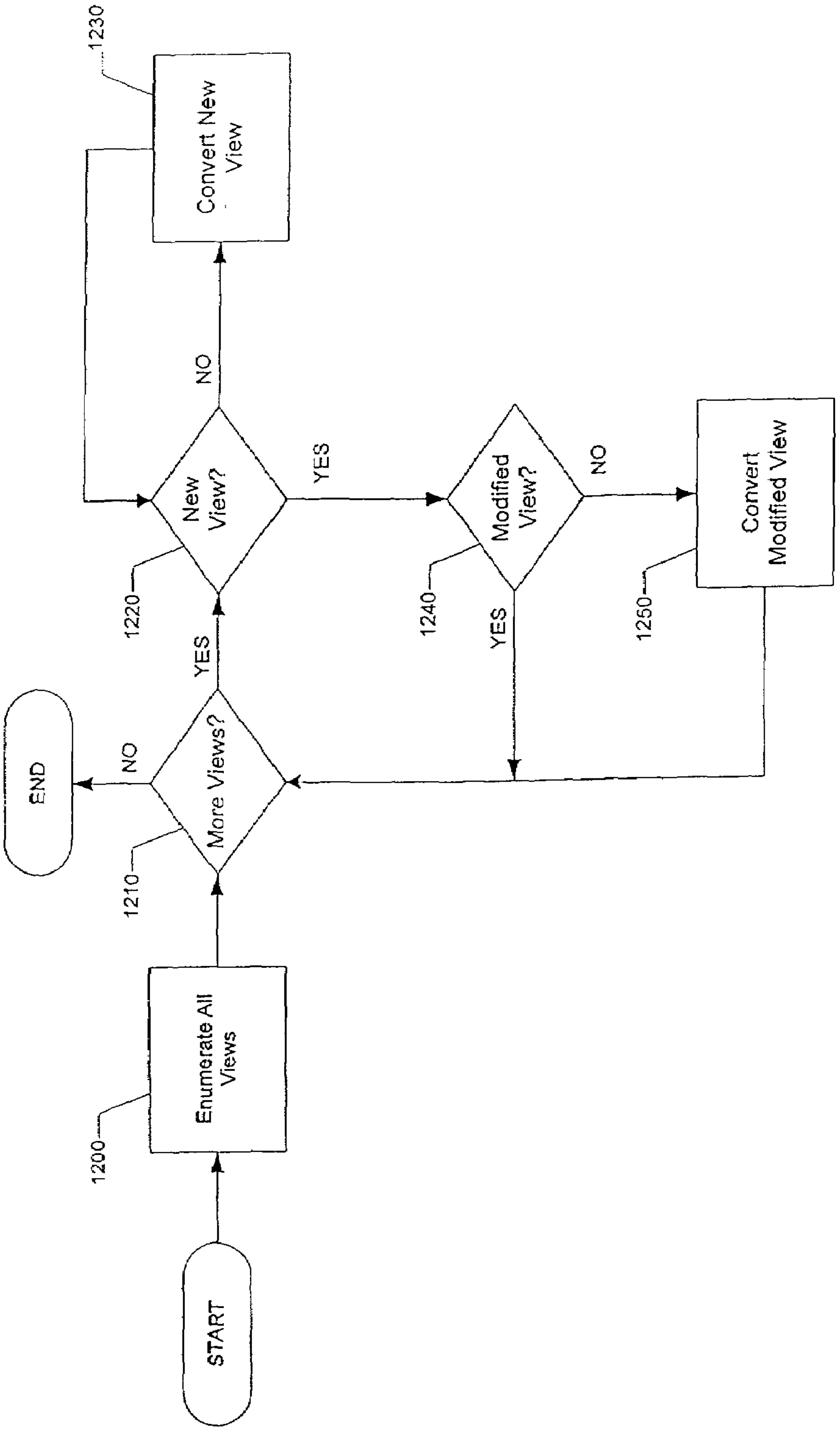
FIG. 12 is a flow chart illustrating converting views.

FIG. 12 is a flow chart illustrating the conversion of views. Views to be converted can either be new or modified views. Step 650 of FIG. 6 represents converting new and modified views. All views are sorted and examined or enumerated, step 1200. The enumerated list is examined for each view and a determination is made until the list is exhausted, step 1210. If there is a view on the list to be examined at, a determination is made as to whether the view is a new view, step 1220. If it is a new view, the view is converted, step 1230. A new view that is converted is treated as a converted view. If a view in step 1220 is not a new view, a determination is made as to whether the view is a modified view, step 1240. If the view is not a modified view, the process goes to step 1210. If the view is a modified view, the modified view is converted, step 1250.

Figure 13:
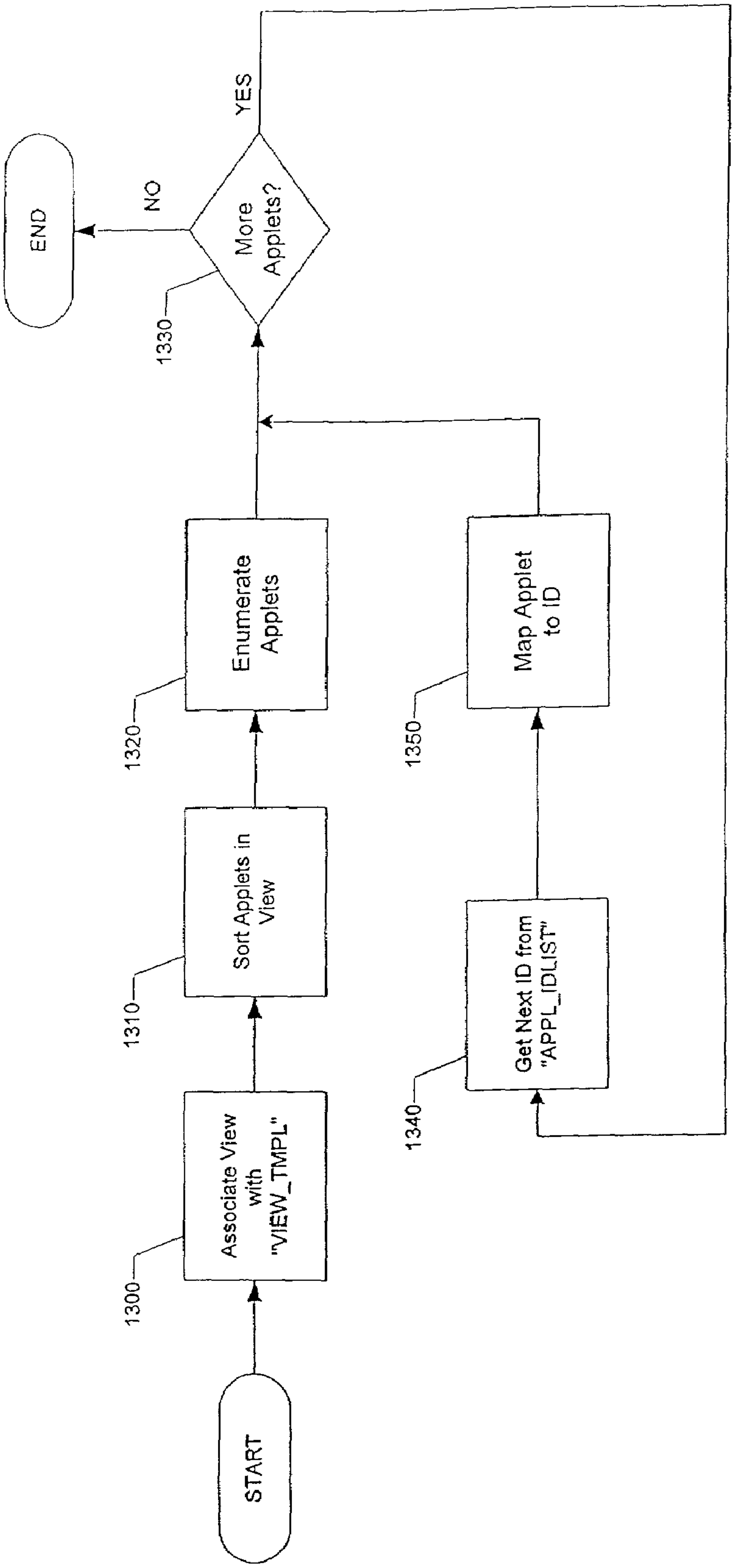
FIG. 13 is a flow chart illustrating converting new views.

FIG. 13 is a flow chart illustrating the conversion of new views. Converting new views is represented by step 1230 of FIG. 12. The previous pseudo-code program "RunWizard" calls a routine "ConvertNewView." The flow chart of FIG. 13 represents the routine "ConvertNewView." The conversion of new views involves assigning a sequence number to the applets in the current view-based on the position of the applet in the view. Sequence numbers are assigned going from top to bottom. Mappings for the applets are created using the assigned sequence numbers, for example applet with sequence number 1 is mapped to the first ID in the list variable "IDLIST" ("APPL_IDLIST").

The new view is associated with the HTML template "VIEW_TMPL," step 1300. The applets in the new view are then sorted, step 1310. Each applet in the new view is examined at or enumerated, step 1320. A determination is made as to whether additional applets are to be examined at, step 1330. If no additional applets, the process ends. If additional applets are found, the next ID number from the list variable "APPL_IDLIST" is retrieved, step 1340. The mapping of the applet to an ID then takes place, step 1350. The process goes back to step 1330 to determine if additional controls exist.

Figure 14:
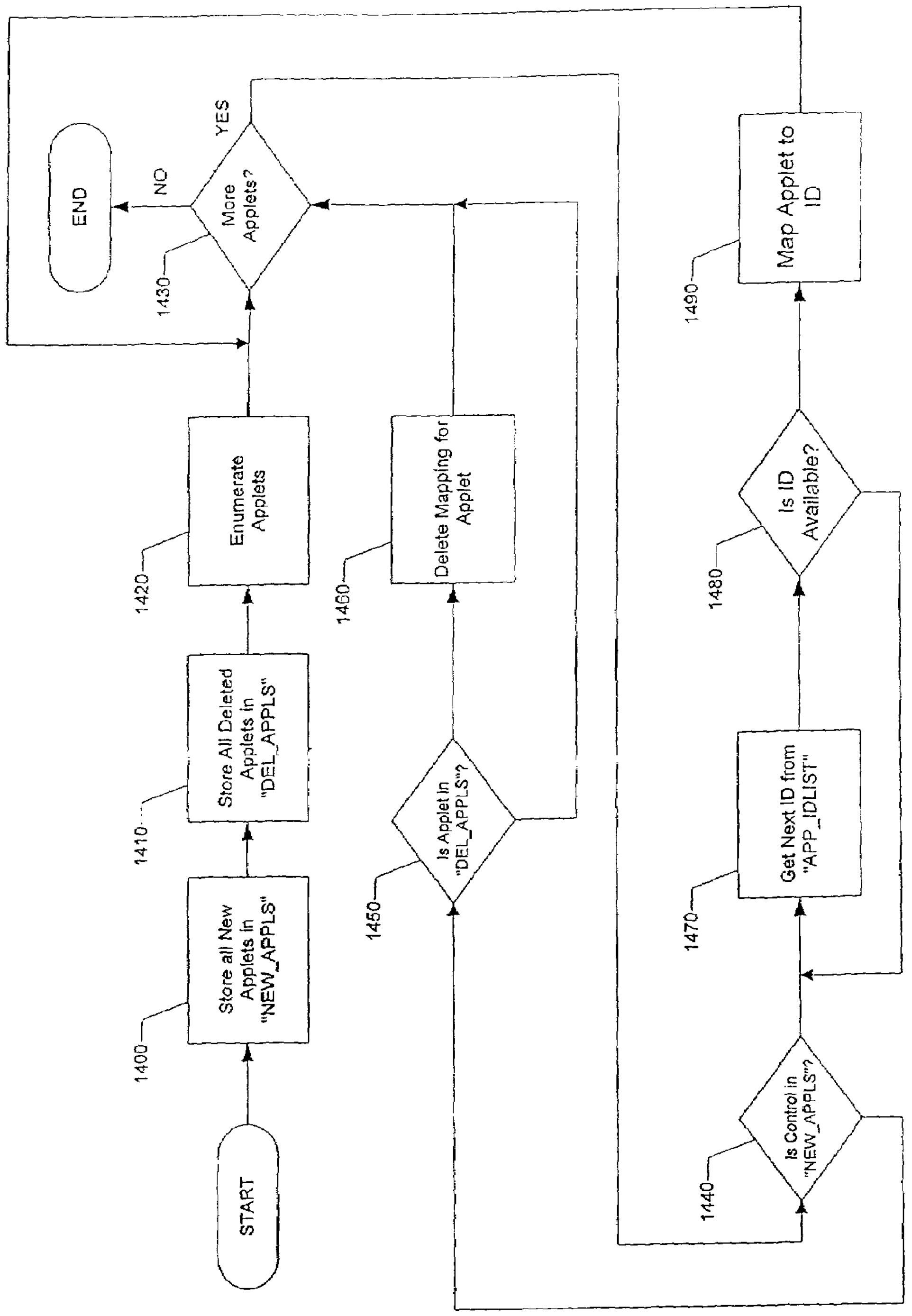
FIG. 14 is a flow chart illustrating converting modified views.

FIG. 14 is a flow chart illustrating the conversion modified views. Converting modified views is represented by step 1250 of FIG. 12. The previous pseudo-code program "RunWizard" calls a routine "ConvertModifiedView." The flow chart of FIG. 14 represents the routine "ConvertModifiedView." The conversion of modified views involves finding new applets in the current view. These new applets are not part of existing vendor provided views, but are user specific applets. Deleted applets are found as well. In particular cases, a user may find the need to delete applets. For added applets, a mapping is created for the added applet to be mapped to the first available ID from the list variable "IDLIST." The ID that maps a deleted applet is removed from "IDLIST."

The process retrieves new applets of the modified view. New applets are stored in the list variable "NEW_APPLS," step 1400. All deleted applets are stored in the list variable, "DEL_APPLS," step 1410. Each of the applets in the list variables "NEW_APPLS" and "DEL_APPLS" is examined at, or enumerated, step 1420. A determination is made as to whether additional applets (new or deleted controls) are available, step 1430. If no more controls are available, the process for converting modified views ends.

If additional applets are available, a determination is made if the applet is a new applet in the list variable "NEW_APPLS," step 1440. If the applet is not a new applet, a determination if the applet is in the list variable, "DEL_APPLS," step 1450. If the applet fails step 1450, the process goes back to step 1430. If the applet is found in "DEL_APPLS," the applet is deleted from the current mapping for applets. If the applet is a new applet, the next available ID is retrieved from the list variable "APP_IDLIST," step 1470. A determination is made if the next available ID is available, step 1480. If the ID is available, "APP_IDLIST" is searched until an available ID is found. The available ID is then mapped to the applet, step 1490. The process then goes to step 1430 to determine if more applets are to be either mapped (added) or deleted.

An Example Computing and Network Environment

Figure 15:
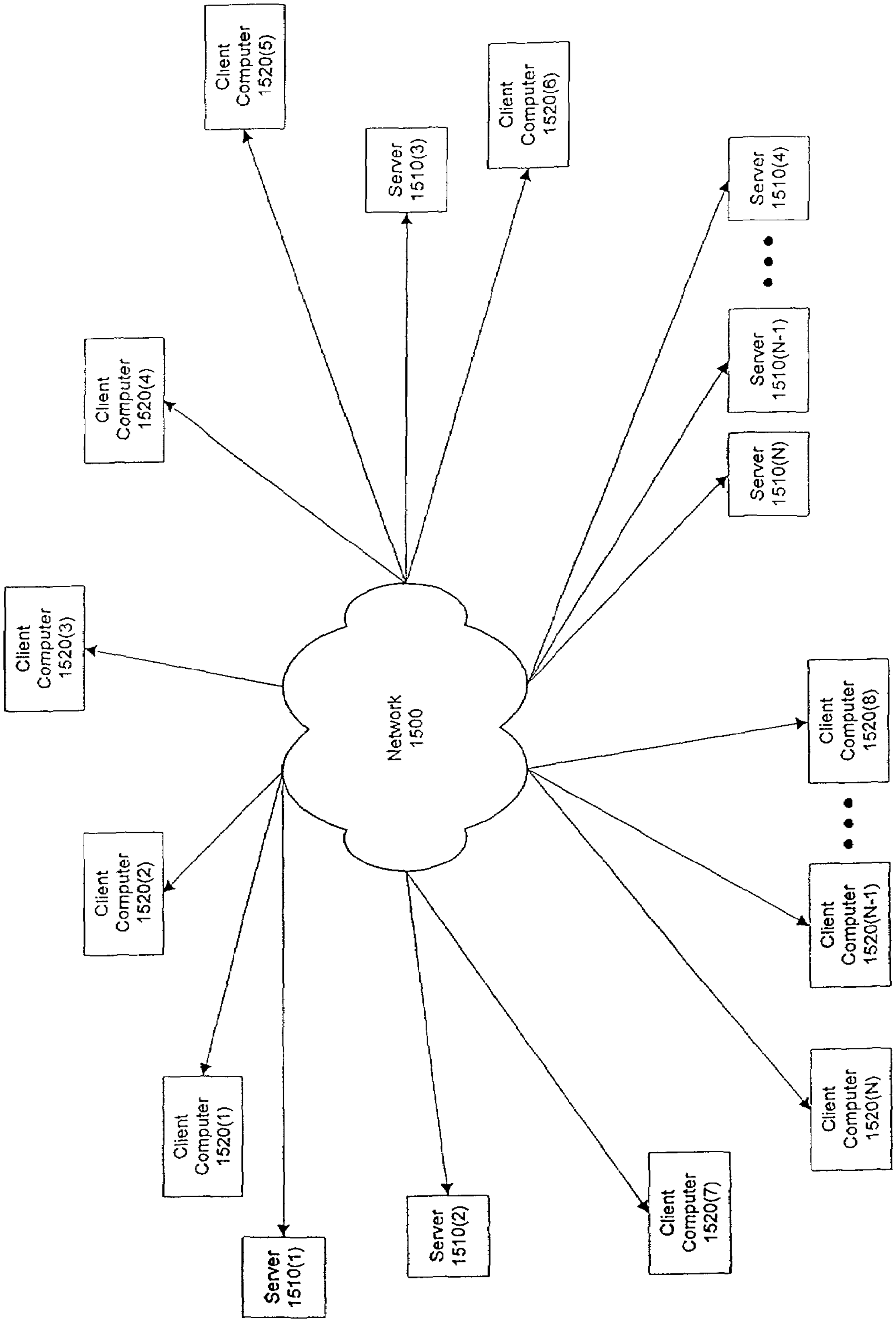
FIG. 15 is a block diagram illustrating a network environment in which embodiments of the present invention may be practiced.

FIG. 15 is a block diagram illustrating a network environment in which a system according to the present invention may be practiced. As is illustrated in FIG. 15, network 1500, such as a private wide area network (WAN) or the Internet, includes a number of networked servers 1510(1)-(N) that are accessible by client computers 1520(1)-(N). Communication between client computers 1520(1)-(N) and servers 1510(1)-(N) typically occurs over a publicly accessible network, such as a public switched telephone network (PSTN), a DSL connection, a cable modem connection or large bandwidth trunks (e.g., communications channels providing T1 or OC3 service). Client computers 1520(1)-(N) access servers 1510(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 1520(1)-(N).

One or more of client computers 1520(1)-(N) and/or one or more of servers 1510(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 1520(1)-(N) is shown in detail in FIG. 15.

Figure 16:
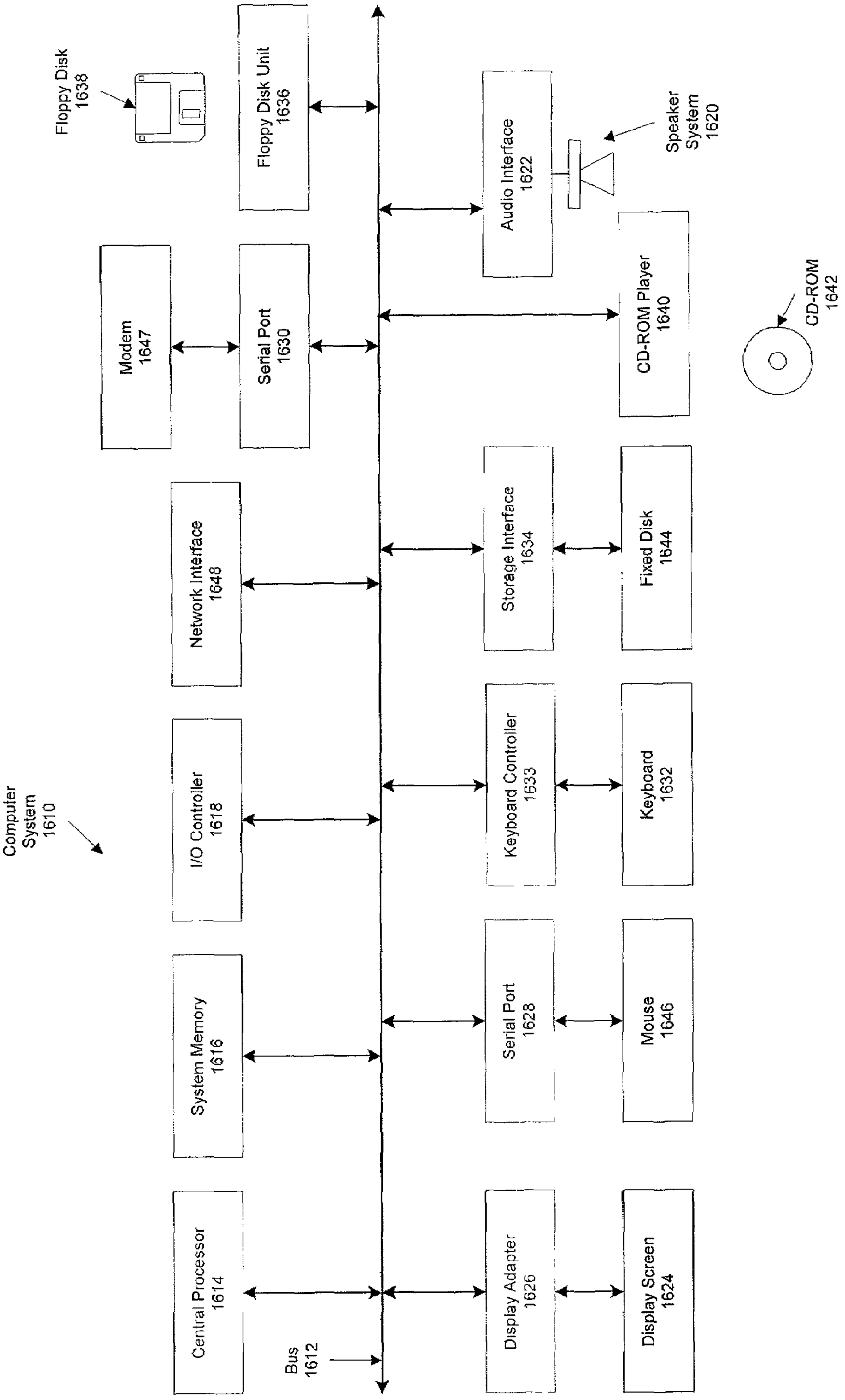
FIG. 16 is a block diagram illustrating a computer system suitable for implementing embodiments of the present invention.

FIG. 16 depicts a block diagram of a computer system 1610 suitable for implementing the present invention, and example of one or more of client computers 1520(1)-(N). Computer system 1610 includes a bus 1612 which interconnects major subsystems of computer system 1610 such as a central processor 1614, a system memory 1616 (typically RAM but which may also include ROM, flash RAM, or the like) an input/output controller 1618, an external audio device such as a speaker system 1620 via an audio output interface 1622, an external device such as a display screen 1624 via display adapter 1626, serial ports 1628 and 1630, a keyboard 1632 (interfaced with a keyboard controller 1633), a storage interface 1634, a floppy disk drive 1636 operative to receive a floppy disk 1638, and a CD-ROM drive 1640 operative to receive a CD-ROM 1642. Also included are a mouse 1646 (or other point-and-click device, coupled to bus 1612 via serial port 1628), a modem 1647 (coupled to bus 1612 via serial port 1630) and a network interface 1648 (coupled directly to bus 1612).

Bus 1612 allows data communication between central processor 1614 and system memory 1616, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 1610 are generally stored on and accessed via a computer readable medium, such as a hard disk drive (e.g., fixed disk 1644), an optical drive (e.g., CD-ROM drive 1640), floppy disk unit 1636 or other storage medium. Additionally, applications may be in the form of electronic signals modulated in accordance with the application and data communication technology when accessed via network modem 1647 or interface 1648.

Storage interface 1634, as with the other storage interfaces of computer system 1610, may connect to a standard computer readable medium for storage and/or retrieval of information, such as a fixed disk drive 1644. Fixed disk drive 1644 may be a part of computer system 1610 or may be separate and accessed through other interface systems. Many other devices can be connected such as a mouse 1646 connected to bus 1612 via serial port 1628, a modem 1647 connected to bus 1612 via serial port 1630 and a network interface 1648 connected directly to bus 1612. Modem 1647 may provide a direct connection to a remote server via a telephone link or to the Internet via an internet service provider (ISP). Network interface 1648 may provide a direct connection to a remote server via a direct network link to the Internet via a POP (point of presence). Network interface 1648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 16 to be present to practice the present invention. The devices and subsystems may be interconnected in different ways from that shown in FIG. 16. The operation of a computer system such as that shown in FIG. 16 is readily known in the art and is not discussed in detail in this application. Code to implement the present invention may be stored in computer-readable storage media such as one or more of system memory 1616, fixed disk 1644, CD-ROM 1642, or floppy disk 1638. Additionally, computer system 1610 may be any kind of computing device, and so includes personal data assistants (PDAs), network appliance, X-window terminal or other such computing device. The operating system provided on computer system 1610 may be MS-DOS®, MS-WINDOWS®, OS/2®, UNIX®, Linux® or other known operating system. Computer system 1610 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/ or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 1610). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 17:
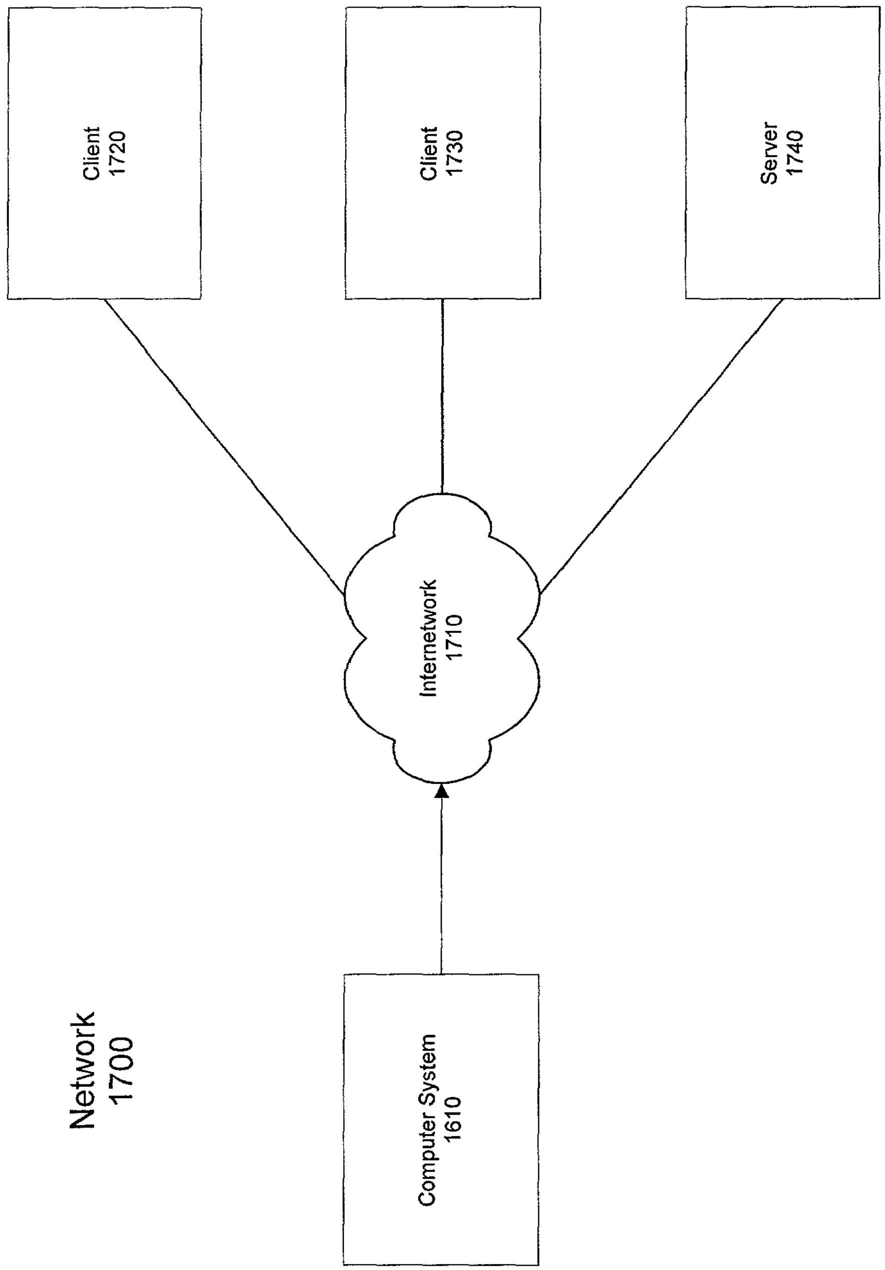
FIG. 17 is a block diagram illustrating the interconnection of the computer system of FIG. 16 to client and host systems.

FIG. 17 is a block diagram depicting a network 1700 in which computer system 1710 is coupled to an internetwork 1710, which is coupled, in turn, to client systems 1720 and 1730, as well as a server 1740. Internetwork 1710 (e.g., the Internet) is also capable of coupling client systems 1720 and 1730, and server 1740 to one another. With reference to computer system 1710, modem 1747, network interface 1748 or some other method can be used to provide connectivity from computer system 1710 to internetwork 1710. Computer system 1710, client system 1720 and client system 1730 are able to access information on server 1740 using, for example, a web browser (not shown). Such a web browser allows computer system 1710, as well as client systems 1720 and 1730, to access data on server 1740 representing the pages of a website hosted on server 1740. Protocols for exchanging data via the Internet are well known to those skilled in the art. Although FIG. 17 depicts the use of the Internet for exchanging data, the present invention is not limited to the Internet or any particular network-based environment.

Referring to FIGS. 15, 16 and 17, a browser running on computer system 1710 employs a TCP/IP connection to pass a request to server 1740, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

Although the present invention has been described in connection with several embodiments, the invention is not intended to be limited to the specific forms set forth herein, but on the contrary, it is intended to cover such alternatives, modifications, and equivalents as can be reasonably included with in the scope of the invention as defined by the appended claims.

What is claimed is:

1. A method comprising:

migrating a Cartesian coordinate-based view to a tag field-based view, wherein
- the Cartesian coordinate-based view and the tag field-based view are user interfaces for presenting the same information, and
- said migrating comprises
  - selecting a tag field-based view, wherein
    - the selected tag field-based view comprises one or more applets, and
    - the selected tag field-based view is configured to serve as a model for converting the Cartesian coordinate-based view into the tag-field based view,
  - identifying a first applet of the one or more applets, wherein the first applet comprises one or more controls,
  - associating the first applet with a tag field-based template for the first applet, wherein
    - the tag field-based template for the first applet comprises one or more characteristics of each of the one or more controls, and
    - the tag field-based template for the first applet is configured to serve as a model for converting a Cartesian view applet in the Cartesian coordinate-based view to a corresponding tag-field based applet,
  - associating the tag field-based template for the first applet to a corresponding first Cartesian view applet in the Cartesian coordinate-based view, wherein
    - the first Cartesian view applet comprises a Cartesian view control,
  - converting the Cartesian view control to produce a corresponding tag field-based view control, wherein
    - said converting matches the Cartesian view control with characteristics of the one or more controls in the tag field-based template for the first applet,
  - mapping the corresponding tag field-based view control to the selected tag field-based view.

2. The method of claim 1 wherein at least one of the controls is a field control.

3. The method of claim 1 wherein at least one of the controls is a non-field control.

4. The method of claim 1 further comprising:

mapping the one or more controls to specific sequence numbers.

5. The method of claim 4 wherein at least one of the controls is a field control.

6. The method of claim 4 wherein at least one of the controls is a non-field control.

7. The method of claim 1 further comprising:

mapping the first applet to a specific sequence number.

8. The method of claim 7 wherein at least one of the controls is a field control.

9. The method of claim 7 wherein at least one of the controls is a non-field control.

10. The method of claim 1 further comprising:

adding an added control to the tag field-based template for the first applet.

11. The method of claim 10 wherein the added control is a field control.

12. The method of claim 10 wherein the added control is a non-field control.

13. The method of claim 1 further comprising:

deleting a deleted control from the tag field-based template for the first applet.

14. The method of claim 13 wherein the deleted control is a field control.

15. The method of claim 13 wherein the deleted control is a non-field control.

16. The method of claim 1 further comprising:

providing one or more model views for a user to select from, wherein one or more selected model views correspond to the Cartesian coordinate-based view.

17. The method of claim 16 wherein at least one of the controls is a field control.

18. The method of claim 16 wherein at least one of the controls is a non-field control.

19. A computer system comprising:

a processor;

a computer readable medium coupled to the processor; and computer code, encoded in the computer readable medium, configured to cause the processor to:

migrate a Cartesian coordinate-based view to a tag field-based view, wherein the Cartesian coordinate-based view and the tag field-based view are user interfaces for presenting the same information, select a tag field-based view, wherein the selected tag field-based view comprises one or more applets, and the selected tag field-based view is configured to serve as a model for converting the Cartesian coordinate-based view into the tag-field based view, identify a first applet of the one or more applets, wherein the first applet comprises one or more controls, associate the first applet with a tag field-based template for the first applet, wherein the tag field-based template for the first applet comprises one or more characteristics of each of the one or more controls, and the tag field-based template for the first applet is configured to serve as a model for converting a Cartesian view applet in the Cartesian coordinate-based view to a corresponding tag-field based applet, associate the tag field-based template for the first applet to a corresponding first Cartesian view applet in the Cartesian coordinate-based view, wherein the first Cartesian view applet comprises a Cartesian view control, convert the Cartesian view control to produce a corresponding tag field-based view control, wherein converting the Cartesian view control matches characteristics the one or more controls in the tag field-based template for the first applet, map the corresponding tag field-based view control to the selected tag field-based view.

20. The computer system of claim 19 wherein at least one of the controls is a field control.

21. The computer system of claim 19 wherein at least one of the controls is a non-field control.

22. The computer system of claim 19 wherein the processor is furthered configured to:

map the one or more controls to specific sequence numbers.

23. The computer system of claim 22 wherein at least one of the controls is a field control.

24. The computer system of claim 22 wherein at least one of the controls is a non-field control.

25. The computer system of claim 19 wherein the processor is furthered configured to:

map the first applet to a specific sequence number.

26. The computer system of claim 25 wherein at least one of the controls is a field control.

27. The computer system of claim 25 wherein at least one of the controls is a non-field control.

28. The computer system of claim 19 wherein an added control is added to the tag field-based template for the first applet.

29. The computer system of claim 28 wherein the added control is a field control.

30. The computer system of claim 28 wherein the added is a non-field control.

31. The computer system of claim 19 wherein a deleted control is deleted from the tag field-based template for the first applet.

32. The computer system of claim 31 wherein the deleted control is a field control.

33. The computer system of claim 31 wherein the deleted control is a non-field control.

34. The computer system of claim 19 wherein the processor is furthered configured to:

provide one or more model views for a user to select from, wherein one or more selected model views correspond to the Cartesian coordinate-based view.

35. The computer system of claim 34 wherein at least one of the controls is a field control.

36. The computer system of claim 34 wherein at least one of the controls is a non-field control.

37. An apparatus comprising:

means for migrating a Cartesian coordinate-based view to a tae field-based view, wherein the Cartesian coordinate-based view and the tag field-based view are user interfaces for presenting the same information, and said means for migrating comprises means for selecting a tag field-based view, wherein the selected tag field-based view comprises one or more applets, and the selected tag field-based view is configured to serve as a model for converting the Cartesian coordinate-based view into the tag-field based view, means for identifying a first applet of the one or more applets, wherein the first applet comprises one or more controls, means for associating the first applet with a tag field-based template for the first applet, wherein the tag field-based template for the first applet comprises one or more characteristics of each of the one or more controls, and the tag field-based template for the first applet is configured to serve as a model for converting a Cartesian view applet in the Cartesian coordinate-based view to a corresponding tag-field based applet, means for associating the tag field-based template for the first applet to a corresponding first Cartesian view applet in the Cartesian coordinate-based view, wherein the first Cartesian view applet comprises a Cartesian view control, means for converting the Cartesian view control to produce a corresponding tag field-based view control, wherein said converting matches the Cartesian view control with characteristics of the one or more controls in the tag field-based template for the first applet, means for mapping the corresponding tag field-based view control to the selected tag field-based view.

38. The apparatus of claim 37 wherein at least one of the controls is a field control.

39. The apparatus of claim 37 wherein at least one of the controls is a non-field control.

40. The apparatus of claim 37 further comprising:

means for mapping the one or more controls to specific sequence numbers.

41. The apparatus of claim 40 wherein at least one of the controls is a field control.

42. The apparatus of claim 40 wherein at least one of the controls is a non-field control.

43. The apparatus of claim 37 further comprising:

means for mapping the first applet to a specific sequence number.

44. The apparatus of claim 43 wherein at least one of the controls is a field control.

45. The apparatus of claim 43 wherein at least one of the controls is a non-field control.

46. The apparatus of claim 37 further comprising:

means for adding an added control to the tap field-based template for the first applet.

47. The apparatus of claim 46 wherein the added control is a field control.

48. The apparatus of claim 46 wherein the added control is a non-field control.

49. The apparatus of claim 37 further comprising:

means for deleting a deleted control from the tap field-based template for the first applet.

50. The apparatus of claim 49 wherein the deleted control is a field control.

51. The apparatus of claim 49 wherein the deleted control is a non-field control.

52. The apparatus of claim 37 further comprising:

means for providing one or more model views for a user to select from, wherein one or more selected model views correspond to the Cartesian coordinate-based view.

53. The apparatus of claim 52 wherein at least one of the controls is a field control.

54. The apparatus of claim 52 wherein at least one of the controls is a non-field control.

55. A computer program product, encoded in computer readable media, comprising:

a first set of instructions, executable on a computer system, configured to migrate a Cartesian coordinate-based view to a tag field-based view, wherein Cartesian coordinate-based view and the tag field-based view are user interfaces for presenting the same information, and the first set of instructions comprises a first subset of instructions, executable on the computer system, configured to select a tag field-based view, wherein the selected tag field-based view comprises one or more applets, and the selected tag field-based view is configured to serve as a model for converting the Cartesian coordinate-based view into the tag-field based view, a second subset of instructions, executable on the computer system, configured to identify a first applet of the one or more applets, wherein the first applet is comprised of one or more controls, a third subset of instructions, executable on the computer system, configured to associate the first applet with a tag field-based template for the first applet, wherein the tail field-based template for the first applet comprises one or more characteristics of each of the one or more controls, and the tag field-based template for the first applet is configured to serve as a model for converting a Cartesian view applet in the Cartesian coordinate-based view to a corresponding tag-field based applet, a fourth subset of instructions, executable on the computer system, configured to associate the tag field-based template for the first applet to a corresponding first Cartesian view applet in the Cartesian coordinate-based view, wherein the first Cartesian coordinate-based view applet comprises a Cartesian view control, a fifth subset of instructions, executable on the computer system, configured to convert the Cartesian view control to produce a corresponding tag field-based view control, wherein said converting matches the Cartesian view control with characteristics of the one or more controls in the tag field-based template for the first applet, a sixth subset of instructions, executable on the computer system, configured to map the corresponding tag field-based view control to the selected tag field-based view.

56. The computer program product of claim 55 wherein at least one of the controls is a field control.

57. The computer program product of claim 55 wherein at least one of the controls is a non-field control.

58. The computer program product of claim 55 further comprising:

a seventh subset of instructions, executable on the computer system, configured to map the one or more controls to specific sequence numbers.

59. The computer program product of claim 58 wherein at least one of the controls is a field control.

60. The computer program product of claim 58 wherein at least one of the controls is a non-field control.

61. The computer program product of claim 55 further comprising:

a seventh subset of instructions, executable on the computer system, configured to map the first applet to a specific sequence number.

62. The computer program product of claim 61 wherein at least one of the controls is a field control.

63. The computer program product of claim 61 wherein at least one of the controls is a non-field control.

64. The computer program product of claim 55 further comprising:

a seventh subset of instructions, executable on the computer system, configured to add an added control to the tag field-based template for the first applet.

65. The computer program product of claim 64 wherein the added control is a field control.

66. The computer program product of claim 64 wherein the added control is a non-field control.

67. The computer program product of claim 55 further comprising:

a seventh subset of instructions, executable on the computer system, configured to delete a deleted control from the tag field-based template for the first applet.

68. The computer program product of claim 67 wherein the deleted control is a field control.

69. The computer program product of claim 67 wherein the deleted control is a non-field control.

70. The computer program product of claim 55 further comprising:

a seventh subset of instructions, executable on the computer system, configured to provide one or more model views for a user to select from, wherein one or more selected model views correspond to the Cartesian coordinate-based view.

71. The computer program product of claim 70 wherein at least one of the controls is a field control.

72. The computer program product of claim 70 wherein at least one of the controls is a non-field control.

* * * * *

UNITED STATES PATENT AND TRADEMARK OFFICE

CERTIFICATE OF CORRECTION

PATENT NO. : 7,673,232 B2
APPLICATION NO. : 09/955361
DATED : March 2, 2010
INVENTOR(S) : Fuad Rashid et al.

It is certified that error appears in the above-identified patent and that said Letters Patent is hereby corrected as shown below:

In column 5, lines 15-16, delete “interfaces” and insert -- interfaces. --, therefor.

In column 5, line 24, delete “a” and insert -- an --, therefor.

In column 9, line 52, delete “RAM” and insert -- RAM, --, therefor.

In column 9, line 53, delete “like)” and insert -- like), --, therefor.

In column 13, line 54, in Claim 19, delete “the” and insert -- of the --, therefor.

In column 14, line 36, in Claim 37, delete “a tae” and insert -- a tag --, therefor.

In column 15, line 28, in Claim 46, delete “tap” and insert -- tag --, therefor.

In column 15, line 35, in Claim 49, delete “tap” and insert -- tag --, therefor.

In column 16, line 10, in Claim 55, delete “tail” and insert -- tag --, therefor.

Signed and Sealed this

Twenty-eighth Day of September, 2010

David J. Kappos

*Director of the United States Patent and Trademark Office*